US012636133B2

(12) United States Patent
Song et al.

(10) Patent No.: US 12,636,133 B2
(45) Date of Patent: May 26, 2026

(54) METHOD FOR PROVIDING INFORMATION FOR DENTAL TREATMENT AND ELECTRONIC DEVICE PERFORMING SAME

(71) Applicant: MEDIT CORP., Seoul (KR)

(72) Inventors: Myoung Woo Song, Seoul (KR); Ha Ram Jeon, Seoul (KR)

(73) Assignee: MEDIT CORP., Seoul (KR)

( * ) Notice: Subject to any disclaimer, the term of this patent is extended or adjusted under 35 U.S.C. 154(b) by 423 days.

(21) Appl. No.: 18/041,905

(22) PCT Filed: Sep. 7, 2021

(86) PCT No.: PCT/KR2021/012096
§ 371 (c)(1),
(2) Date: Feb. 16, 2023

(87) PCT Pub. No.: WO2022/050809
PCT Pub. Date: Mar. 10, 2022

(65) Prior Publication Data
US 2023/0310126 A1 Oct. 5, 2023

(30) Foreign Application Priority Data

Sep. 7, 2020 (KR) ........................ 10-2020-0114130
Jan. 27, 2021 (KR) ........................ 10-2021-0011797

(51) Int. Cl.
*G06T 19/20* (2011.01)
*A61C 13/00* (2006.01)
*A61C 13/34* (2006.01)
(52) U.S. Cl.
CPC .......... *A61C 13/0004* (2013.01); *A61C 13/34* (2013.01); *G06T 19/20* (2013.01); *G06T 2219/2004* (2013.01)

(58) Field of Classification Search
None
See application file for complete search history.

(56) References Cited

U.S. PATENT DOCUMENTS 9,503,282 B2 11/2016 Kody et al.
2009/0133260 A1 5/2009 Durbin et al.
(Continued)

FOREIGN PATENT DOCUMENTS

KR 10-1444727 B1 9/2014
KR 10-2016-004864 A 1/2016
(Continued)

OTHER PUBLICATIONS

Korean Office Action for KR 10-2021-0011797, dated Jun. 29, 2022.
(Continued)

*Primary Examiner* — Yi Wang
(74) *Attorney, Agent, or Firm* — Sughrue Mion, PLLC

(57) ABSTRACT

A method of providing information for dental treatment includes acquiring a design model that is generated based on a first scan model acquired by scanning a target object and is a model for an artifact to be attached to the target object, acquiring a second scan model generated by scanning the artifact manufactured based on the design model, aligning the first scan model and the second scan model, and identifying an incorrectly-made part in the second scan model, based on a result of the alignment, and generating information corresponding to the identified incorrectly-made part in the second scan model.

15 Claims, 26 Drawing Sheets

(56)                    References Cited

U.S. PATENT DOCUMENTS

| | | |
|---|---|---|
| 2015/0265371 A1 | 9/2015 | Kim |
| 2016/0125651 A1 | 5/2016 | Lior et al. |
| 2019/0125502 A1 | 5/2019 | Haus |
| 2019/0318479 A1* | 10/2019 | Ajri ..................... G06T 7/0014 |

FOREIGN PATENT DOCUMENTS

| | | | |
|---|---|---|---|
| KR | 10-1801827 B1 | 11/2017 | |
| KR | 10-1862749 B1 | 5/2018 | |
| KR | 10-1862751 B1 | 5/2018 | |
| KR | 10-1862752 B1 | 5/2018 | |
| KR | 1862749 B1 * | 5/2018 | ............. G06F 17/50 |
| KR | 1862751 B1 * | 5/2018 | ......... G05B 19/4097 |
| KR | 10-2020-0000704 A | 1/2020 | |
| WO | 2010/053726 A2 | 5/2010 | |

OTHER PUBLICATIONS

Korean Notice of Allowance for KR 10-2021-0011797, dated Nov. 18, 2022.
International Search Report for PCT/KR2021/012096, dated Dec. 14, 2021.
Extended European Search Report dated Aug. 22, 2024 in Application No. 21864766.7.

* cited by examiner

FIG. 6

METHOD FOR PROVIDING INFORMATION FOR DENTAL TREATMENT AND ELECTRONIC DEVICE PERFORMING SAME

TECHNICAL FIELD

Embodiments of the present disclosure relate to a method of providing information for oral treatment and an electronic device for performing the method.

Specifically, embodiments of the present disclosure relate to a method of providing information used in performing oral treatment by attaching an artifact to a tooth, and an electronic device for performing the method.

BACKGROUND ART

There are various fields in the dental treatment of patients. The field of dental treatment includes, for example, tooth decay treatment or restoration treatment for damaged teeth.

For example, when tooth decay occurs, treatment may be performed in which a part of a tooth where tooth decay has occurred is cut according to progress of the tooth decay, and the cut tooth is restored by using an artifact.

For example, the dental pulp of a tooth may be decayed. In this case, the decayed part of the tooth is cut, nerve treatment is performed for the dental pulp in the cut tooth, and then, crown treatment has to be performed.

Here, the crown treatment means treatment of attaching or coupling to the cut tooth a crown surrounding the outside of the cut tooth. For the crown treatment, a crown suitable for the cut tooth needs to be manufactured. In addition, it is most important that a crown to be attached to the cut tooth is correctly manufactured. In general, in order to determine whether a crown is correctly manufactured, a dental treatment expert, such as a doctor, directly attaches a manufactured crown to a patient's tooth and checks the state of the attached crown.

In addition, as a result of the manual inspection, when it is determined that the crown is incorrectly manufactured, for example, when it is determined that the crown collides with the cut tooth or when it is determined that the crown is manufactured to be smaller than the cut tooth, the crown has to be remanufactured.

Therefore, when the crown is incorrectly manufactured, there is inconvenience in that a patient has to visit the dentist additionally and the crown has to be sent to a manufacturing facility, such as a laboratory, for correction or remanufacturing.

Therefore, there is a need to provide a method and device that may reduce discomfort due to incorrect manufacturing of a crown.

DISCLOSURE

Technical Problem

Embodiments of the present disclosure provide a method of providing information for dental treatment and an electronic device for performing the method, which may increase manufacturing accuracy of artifacts, such as crowns.

Specifically, embodiments of the present disclosure provides a method of providing information for dental treatment and an electronic device for performing the method, which may provide information for enabling dental treatment experts, such as doctors or dental technicians, to easily recognize incorrect manufacturing of artifacts, such as crowns.

In addition, embodiments of the present disclosure provide a method of providing information for dental treatment and an electronic device for performing the method, which may reduce inconvenience and inefficiency of users due to incorrect manufacturing of artifacts.

Technical Solution

According to an aspect of the present disclosure, a method of providing information for dental treatment including acquiring a design model that is generated based on a first scan model acquired by scanning a target object and is a model for an artifact to be attached to the target object, acquiring a second scan model generated by scanning the artifact manufactured based on the design model, aligning the first scan model and the second scan model, and identifying an incorrectly-made part in the second scan model based on a result of the alignment and generating information corresponding to the identified incorrectly-made part in the second scan model.

In addition, the aligning may include aligning the first scan model coupled to the design model, and the second scan model.

In addition, the aligning may include aligning the first scan model and the second scan model based on a line corresponding to a boundary surface where the target object is coupled to the artifact.

In addition, the target object may be a tooth or an abutment of an implant, the artifact may be a crown, and the line may be a margin line.

In addition, the aligning may include aligning the first scan model coupled to the design model and the second scan model based on a first line corresponding to the margin line of the target object in the design model and a second line corresponding to the margin line of the target object in the second scan model.

In addition, the generating of the information may include identifying a part of the second scan model which collides with at least one of the target object and at least one tooth adjacent to the target object, based on the result of the alignment, and identifying the part of the collision as an incorrectly-made part.

In addition, the generating of the information may include classifying degrees of collision of the second scan model with at least one of the target object and at least one tooth adjacent to the target object into a plurality of levels and generating the information such that the plurality of classified levels are differently displayed by using at least one of different colors, transparencies, patterns, symbols, figures, and texts.

In addition, the method of providing information for dental treatment according to an embodiment of the present disclosure may further include outputting a user interface screen including the information on the incorrectly-made part.

In addition, the method of providing information for dental treatment may further include guide information for guiding correction of the incorrectly-made part of the artifact.

In addition, the information may further include information on at least one of a thickness, a length, an area, and a volume of the incorrectly-made part.

In addition, the artifact may be one of a crown, an inlay, and an onlay.

In addition, the acquiring of the design model may include acquiring a design model obtained by three-dimensionally modeling an artifact to be attached to the target object through a computer aided design (CAD) based on the first scan model.

In addition, the aligning may include comparing an entire shape of the design model coupled to the first scan model with an entire shape of the second scan model and first aligning the design model and the second scan model, and second aligning the design model and the second scan model, which are first aligned, based on margin information.

According to another aspect of the present disclosure, an electronic device that provides information for dental treatment includes a communication interface configured to receive data from an external device, and a processor configured to execute at least one instruction to generate information for dental treatment. Here, the processor acquires a design model that is generated based on a first scan model acquired by scanning a target object and indicates an artifact to be attached to the target object, acquires a second scan model generated by scanning the artifact manufactured based on the design model, aligns the first scan model and the second scan model, and identifies an incorrectly-made part in the second scan model based on a result of the alignment and generates information corresponding to the identified incorrectly-made part in the second scan model.

In addition, the processor may align the first scan model coupled to the design model and the second scan model based on a line corresponding to a boundary surface where the target object is coupled to the artifact.

In addition, the processor may align the first scan model coupled to the design model and the second scan model based on a margin line of the design model and a margin line of the second scan model.

In addition, the electronic device according to an embodiment of the present disclosure may further include a display, wherein the processor may control the display to output a user interface screen including the information on the incorrectly-made part.

In addition, the electronic device according to an embodiment of the present disclosure may further include a display, wherein the processor may control the display to output a user interface screen including information on the incorrectly-made part and guide information for guiding correction of the incorrectly-made part.

According to another aspect of the present disclosure, a computer-readable recording medium, on which one or more programs are recorded, includes instructions for performing a method of providing information for dental treatment that includes acquiring a design model that is generated based on a first scan model acquired by scanning a target object and is a model for an artifact to be attached to the target object, acquiring a second scan model generated by scanning the artifact manufactured based on the design model, aligning the first scan model and the second scan model, and identifying an incorrectly-made part in the second scan model based on a result of the alignment and generating information corresponding to the identified incorrectly-made part in the second scan model.

Advantageous Effects

A method of providing information for dental treatment and an electronic device for performing the method according to embodiments of the present disclosure enable dental treatment experts, such as doctors or dental technicians to easily recognize an incorrectly-made part of an artifact, such as a crown.

Specifically, the method of providing information for dental treatment and the electronic device for performing the method according to embodiments of the present disclosure enable incorrectly-made part of an artifact to be quickly recognized and corrected without directly attaching an artifact to be attached to a tooth to a patient's etched tooth.

DESCRIPTION OF DRAWINGS

The present invention may be readily understood from the following detailed description with reference to the accompanying drawings, wherein reference numerals indicate structural elements.

FIG. 6 illustrates views of inlay treatment.

MODE FOR INVENTION

Figure 1:
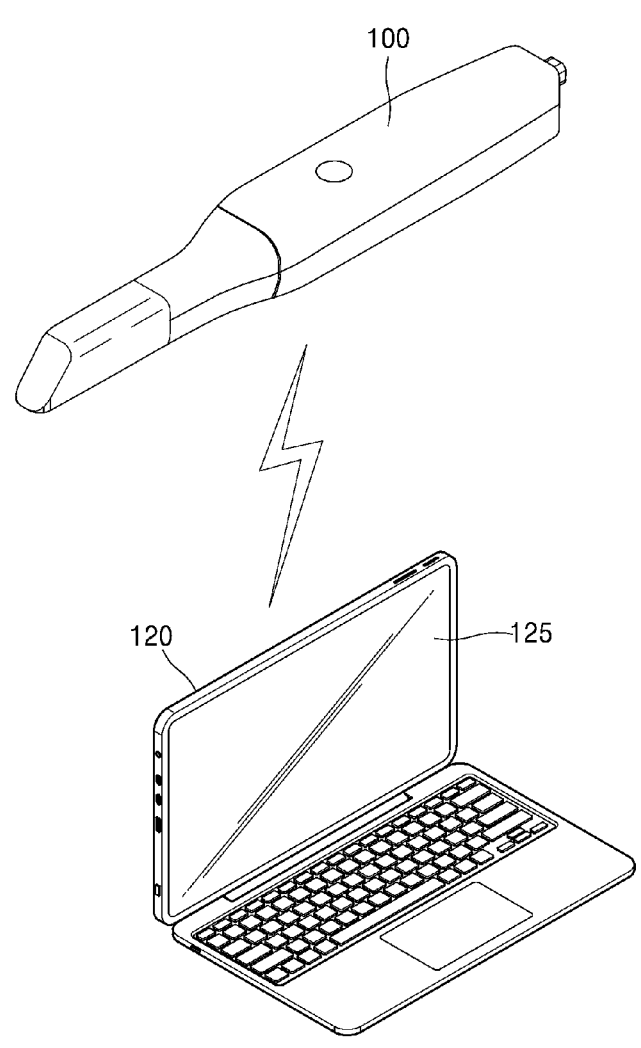
FIG. 1 illustrates electronic devices according to an embodiment of the present disclosure.

The embodiments of the present disclosure clarify the scope of the present invention, describe the principles of the present invention and disclose embodiments such that those skilled in the art may practice the present invention. The embodiments of the present disclosure may be implemented in various forms.

Like reference numerals designate like structural elements throughout the specification. The embodiments of the present disclosure do not describe all components of embodiments, and general contents or overlapping contents between the embodiments in the technical field to which the present disclosure belongs are omitted. Terms 'part' and 'portion' used in the present disclosure may be implemented as software or hardware, and depending on embodiments, a plurality of 'parts or portions' may be implemented as one unit or element, or a single 'part' or 'portion' may also include a plurality of units or elements.

The expression "configured to (or set to)" used in the embodiments of the present disclosure may be replaced with, for example, "suitable for", "having the capacity to", "designed to", "adapted to", "made to", or "capable of" depending on situations. The term "configured (or set) to" may not necessarily mean only "specifically designed to" in hardware. Instead, in some contexts, the expression "a system configured to" may mean that a system "is capable of" in conjunction with other devices or components. For example, the phrase "a processor configured (or set) to perform A, B, and C" may indicate a dedicated processor (for example, an embedded processor) for performing a corresponding operation, or a generic-purpose processor (for example, a central processing unit (CPU) or an application processor) capable of performing a corresponding operation by executing one or more software programs stored in a memory device.

In an embodiment of the present disclosure, a scanner indicates an electronic device that acquires an image related to a target object.

For example, the target object may be a target of dental treatment or an object used for dental treatment. Specifically, a scan target of a scanner may be the inside of the oral cavity or an object related to the oral cavity. In the example described above, the scanner may indicate a scanner that acquires an image related to the oral cavity used for oral treatment. For example, an intraoral scanner in the example of the present disclosure may have a shape that may be inserted into the oral cavity. Here, the intraoral scanner generally has a shape that may be held and carried with one hand, and accordingly, the intraoral scanner may be referred to as a hand-held scanner. Alternatively, the scanner in the example of the present disclosure may be a table-type scanner usable for dental treatment. Specifically, the table-type scanner may be a scanner that may be used for dental treatment by scanning an object related to the oral cavity.

Specifically, a scanner used for dental treatment may acquire at least one of a two-dimensional image and a three-dimensional image corresponding to the oral cavity. For example, a scanner used for dental treatment may acquire at least one two-dimensional image of the oral cavity and generate a three-dimensional image of the oral cavity based on the acquired image.

In another example, a scanner used for dental treatment may acquire at least one two-dimensional image of the oral cavity and transmit the acquired image to an external device. Then, the external device receiving at least one two-dimensional image may generate a three-dimensional image of the oral cavity based on the received two-dimensional image.

Hereinafter, for the sake of convenience of naming and description, scanners for dental treatment including a scanner in a shape that may be inserted into the oral cavity and a table-type scanner are collectively referred to as a 'scanner'.

In the embodiment of the present disclosure, an image may refer to an image (for example, an 'oral image') representing a target object included in the oral cavity. Here, a target object may include a tooth, a gingiva, at least a partial region of the oral cavity, and/or an artificial structure (for example, an orthodontic device including a bracket and a wire, a dental restoration member including an implant, an artificial tooth, a crown, an inlay, and an onlay, an orthodontic support member inserted into the oral cavity, or so on) that may be coupled to, attached to, or inserted into the oral cavity. In addition, a target object may include an object, such as a plaster model or an impression body used to manufacture the artificial structure. Alternatively, a target object may also include an object related to the artificial structure or an object (a tooth or so on) in the oral cavity. In addition, the orthodontic device may include at least one of a bracket, an attachment, an orthodontic screw, a lingual orthodontic device, and a removable orthodontic support device. Hereinafter, for the sake of convenience of naming, the artificial structure and an object used to manufacture the artificial structure may be collectively referred to as an 'artifact'.

Hereinafter, the scanner according to an embodiment of the present disclosure may be any one of the hand-held scanner and the table-type scanner. In addition, in the example described above, a target object to be scanned may be said to be an object related to the oral cavity, and accordingly, the meaning of 'scanning the oral cavity' described throughout the specification may include not only scanning the oral cavity itself, but also scanning the artifact and/or other objects indicating or relating to the oral cavity. Therefore, in the following, a case in which the scanner according to an embodiment of the present disclosure scans the oral cavity is taken as an example to be illustrated and described.

In addition, in embodiments of the present disclosure, an image may be a two-dimensional image of a target object, or a three-dimensional model or three-dimensional image representing the target object.

In addition, in embodiments of the present disclosure, an image may indicate data required to two-dimensionally or three-dimensionally represent a target object, for example, raw data or a raw image acquired by at least one camera. Specifically, the raw image may be acquired to generate an oral image necessary for diagnosis and may be an image (for example, a two-dimensional frame image) acquired by at least one camera included in a scanner when a patient's oral cavity, that is a target object, is scanned by using a scanner (for example, an intraoral scanner). In addition, the raw image is an image that is not processed and may indicate an original image acquired by a scanner.

FIG. 1 illustrates electronic devices according to an embodiment of the present disclosure.

Referring to FIG. 1, electronic devices used for dental treatment in an embodiment of the present disclosure include, for example, a scanner 100 and an oral diagnosis device 120, that is, an electronic device, communicating with the scanner 100. In FIG. 1, a case in which a scanner used for oral treatment is an intraoral scanner having a shape that may be inserted into an oral cavity is taken as an example to be illustrated and described.

Referring to FIG. 1, the scanner 100 is a medical device for acquiring an intraoral image. A scanner having a shape that may be inserted into an oral cavity, such as the scanner 100 illustrated in FIG. 1, may be referred to as an intraoral scanner or a portable scanner. A scanner for dental treatment may be the hand-held scanner illustrated in FIG. 1 or the table-type scanner described above. The table-type scanner is described with reference to FIG. 2 below.

Specifically, the scanner 100 may be a device that is inserted into the oral cavity and scans a target object (for example, an object, such as a tooth, in the oral cavity, an impression body, or so on) in a non-contact manner to generate a three-dimensional model for the oral cavity including at least one tooth.

In addition, the scanner 100 scans the inside of the oral cavity of a patient, an impression body modeled on the inside of the oral cavity of the patient, or so on by using at least one camera (for example, an optical camera or so on). The scanner 100 may acquire surface information on a target object as raw data in order to image a surface of at least one of a tooth inside the oral cavity which is a target object, an impression body that may be inserted into the gingiva or the oral cavity, and a plaster model. Hereinafter, a case in which the scanner 100 scans the oral cavity is described as an example.

The raw data acquired by the scanner 100 may be at least one image acquired by at least one camera included in the scanner 100. Specifically, the raw data may be at least one two-dimensional frame image acquired by performing a scan operation by the scanner 100. Here, the 'frame image' may be referred to as a 'frame' or 'frame data'. The raw data acquired by the scanner 100 may be transmitted to the oral diagnosis device 120 connected thereto through a communication network.

Alternatively, the scanner 100 may acquire a three-dimensional model or a three-dimensional image generated based on raw data acquired from at least one camera. In addition, the acquired three-dimensional model or three-dimensional image may also be transmitted to the oral diagnosis device 120.

The oral diagnosis device 120 may be connected to the scanner 100 through a communication network and may receive data acquired by performing a scan operation from the scanner 100. The oral diagnosis device 120 may refer to an electronic device that may generate, process, display, and/or transmit an oral cavity image based on the data transmitted from the scanner 100.

Specifically, the oral diagnosis device 120 may generate at least one of information necessary for diagnosis of the oral cavity, an image representing the oral cavity, and a model (for example, a three-dimensional model for a tooth, a three-dimensional model for making a crown, or so on) used for oral treatment, based on the data received from the scanner 100 and may display the generated information and image on a display 125.

In addition, the oral diagnosis device 120 may be a computing device, such as a smartphone, a laptop computer, a desktop computer, a personal digital assist (PDA), or a tablet personal computer (PC) but is not limited thereto.

In addition, the oral diagnosis device 120 may also exist in the form of a server (or a server device) for processing oral images.

In addition, the oral diagnosis device 120 may store and execute dedicated software associated with the scanner 100. Here, the dedicated software may be referred to as a dedicated program or a dedicated application. When the oral diagnosis device 120 operates in association with the scanner 100, the dedicated software stored in the oral diagnosis device 120 may receive, in real time, data acquired by scanning a target object connected to the scanner 100. In one embodiment, there may be dedicated software for processing data for each scanner product. The dedicated software may perform at least one operation for acquiring, processing, storing, and/or transmitting a three-dimensional image of a target object.

In addition, the scanner 100 may transmit the raw data acquired by performing a scan operation to the oral diagnosis device 120 as it is. Then, the oral diagnosis device 120 may generate a three-dimensional oral image three-dimensionally representing the oral cavity based on the received raw data. In addition, a 'three-dimensional oral image' may be generated by three-dimensionally modeling an internal structure of the oral cavity based on the received raw data, and accordingly, the data generated in this way may be referred to as a 'three-dimensional oral model', a 'three-dimensional scan model', a 'three-dimensional model', or a 'tooth model'. Hereinafter, the 'three-dimensional oral model', the 'three-dimensional model', or the 'tooth model' are collectively referred to as a 'scan model'.

That is, in the embodiment of the present disclosure, the 'scan model' may refer to a structure three-dimensionally modeled based on data acquired by scanning a target object, such as a tooth, an impression body, and/or an artifact, by using the scanner 100.

In addition, the scanner 100 may scan the oral cavity by using an optical triangulation method, a confocal method, or the like.

Figure 2:
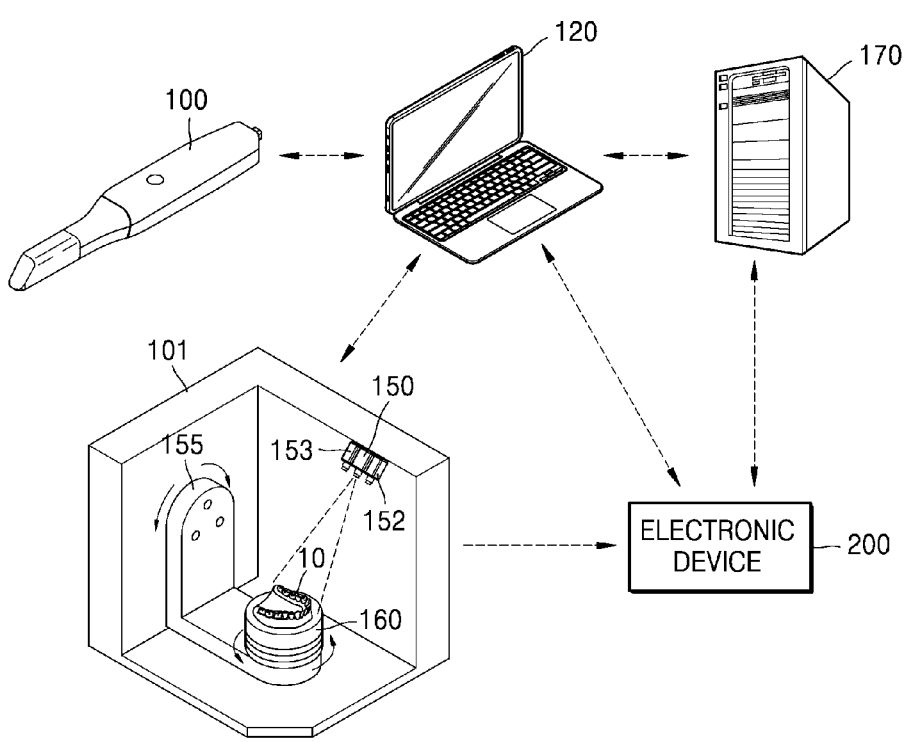
FIG. 2 illustrates electronic devices according to an embodiment of the present disclosure.

FIG. 2 illustrates electronic devices according to an embodiment of the present disclosure. In FIG. 2, the same configurations as in FIG. 1 are denoted by the same reference numerals, and accordingly, detailed descriptions thereof are omitted.

Referring to FIG. 2, an electronic device 200 according to an embodiment of the present disclosure indicates any computing device that may generate, process, transmit, and/or display information for dental treatment.

Specifically, the electronic device 200 according to the embodiment of the present disclosure may be a computing device that may generate information for dental treatment based on data acquired by scanning a tooth to be treated. For example, the electronic device 200 may be a computing device, such as a smartphone, a laptop computer, a desktop computer, a PDA, and a tablet PC but is not limited thereto.

In addition, the electronic device 200 may be the oral diagnosis device 120 itself described in FIG. 1. However, in FIG. 2, a case, in which the electronic device 200 is physically distinct from the oral diagnosis device 120 described in FIG. 1, is illustrated as an example. For example, a case in which the electronic device 200 is physically distinguished from the oral diagnosis device 120 described in FIG. 1 may include a case in which the oral diagnosis device 120 is an electronic device that is located in a dental office and receives data from a scanner (for example, the scanner 100) and the electronic device 200 is located in a laboratory. In this case, the electronic device 200 may receive data acquired by performing a scan operation from a scanner (for example, the scanner 100) or receive data acquired by performing a scan operation from the oral diagnosis device 120.

In addition, the electronic device 200 may also be a server (or a server device).

A server 170 may receive tooth data from at least one of the scanner 100, a scanner 101, and the oral diagnosis device 120. Specifically, the server 170 may be connected to at least one of the scanner 100, the scanner 101, and the oral diagnosis device 120 through a wired or wireless communication network and may receive tooth data from at least one of the scanner 100, the scanner 101, and the oral diagnosis device 120 and store the tooth data. Alternatively, the server 170 may process the received data to generate data used for dental treatment.

As described above, a scanner (for example, the scanner 100) may acquire data through an intraoral scan. The data acquired through the intraoral scan may be tooth data, tooth-related data, or data used for tooth treatment, which may be collectively referred to as 'tooth data'.

The electronic device 200 may receive tooth data from at least one of the scanner 100, the scanner 101, the oral diagnosis device 120, and the server 170.

Specifically, the tooth data may be at least one of i) data acquired by scanning a target object (for example, at least one tooth, an artifact (a crown, an impression body, or so on), or so on), ii) at least one of a two-dimensional image, a three-dimensional image, and a three-dimensional model which are generated based on the data acquired by scanning the target object, iii) an image and/or a model corresponding to an artifact to be attached to, inserted into, or installed on a tooth based on the data acquired by scanning the target object, and iv) at least one of a two-dimensional image, a three-dimensional image, and a three-dimensional model of an artifact which are generated based on the data acquired by scanning the artifact to be attached to, inserted into, or installed on the target object.

In addition, the electronic device 200 may be directly or indirectly connected to at least one of the scanner 100, the scanner 101, the oral diagnosis device 120, and the server 170 through a wired or wireless communication network. In addition, the electronic device 200 may receive the tooth data from at least one of the scanner 100, the scanner 101, the oral diagnosis device 120, and the server 170 through the wired or wireless communication network.

For example, the scanner 100 or the scanner 101 may directly transmit data acquired by performing a scan operation to the electronic device 200. Alternatively, when the scanner 100 transmits data acquired by performing a scan operation to the oral diagnosis device 120, the electronic device 200 may receive the acquired data or data generated by processing the acquired data from the oral diagnosis device 120.

Specifically, tooth data may also be acquired from the scanner 101, which is a table-type scanner, in addition to the scanner 100 which is a hand-held scanner that may be inserted into the oral cavity.

The scanner 101 illustrated in FIG. 2 may acquire three-dimensional data, which represents a shape of a target object by using a principle of triangulation due to pattern deformation, by projecting light onto the target object and scanning the target object onto which the light is projected. A method of acquiring the three-dimensional data is not limited thereto, and various known scan methods may be applied to the method. Here, the scanner 101 may include at least one of cameras 152 and 153, a light emission unit 150, a turn table 160, and an arm 155.

The scanner 101 may acquire raw data by scanning a target object. For example, a target object scanned by the scanner 101 may be an impression model acquired by modeling a tooth to be treated. In one embodiment, the scanner 101 may project light onto a target object 10 on the turntable 160 through the light emission unit 150. The light output from the light emission unit 150 may have various shapes, such as a line or dot shape, a structured-light shape, and a stripe pattern.

In addition, the light output from the light emission unit 150 may be light whose pattern changes itself. For example, the light emission unit 150 may be a projector or so on that outputs light through a light source.

Alternatively, the light emission unit 150 may output light with a preset intensity, the light output from the light emission unit 150 may also be transformed into light with a preset pattern while passing through a pattern generating device (not illustrated) or so on.

The scanner 101 may scan a surface of a target object, onto which light is projected, by using at least one camera (for example, an optical camera or so on) 152 or 153 to obtain image data of the target object. Here, the 'image data' may indicate a plurality of two-dimensional images acquired by scanning the surface of the target object by using at least one camera 152 or 153 in order to generate three-dimensional data of the target object. In this case, the image data may be raw data. Alternatively, the image data acquired by the scanner 101 may also be a three-dimensional image three-dimensionally representing a target object by using two-dimensional images. In FIG. 2, a case in which the scanner 101 includes two cameras 152 and 153 is illustrated as an example.

The turntable 160 may be connected to a housing of the scanner 101 through the arm 155. The turntable 160 may move or rotate according to a preset movement path. In one embodiment, the turn table 160 may swing in an axial direction under control by the arm 155 or may rotate by a preset angle with respect to a central axis. In one embodiment, the turntable 160 may stop for a preset time after moving or rotating once for a unit movement time.

The scanner 101 may be connected to the oral diagnosis device 120 through a wireless communication network. For example, the scanner 101 may communicate with the oral diagnosis device 120 through a wireless communication network conforming to a communication standard, such as the Bluetooth, Wi-Fi, Bluetooth low energy (BLE), near field communication (NFC)/radio frequency identification (RFID), Wi-Fi Direct, Ultra-Wide Band (UWB), or ZigBee. The scanner 101 may transmit the acquired image data to the oral diagnosis device 120.

In addition, although FIG. 2 illustrates that the electronic device 200 is separated from the oral diagnosis device 120 and the server 170, the electronic device 200 may also be the oral diagnosis device 120 itself or the server 170 itself.

As described above, the electronic device 200 described below receives tooth data from at least one of the scanner 100, the scanner 101, the oral diagnosis device 120, and the server 170 and generates information to be provided in the embodiment of the present disclosure based on the received data.

A detailed configuration and a detailed operation of the electronic device 200 according to the embodiment of the present disclosure is described below in detail with reference to FIGS. 3 to 21.

Figure 3:
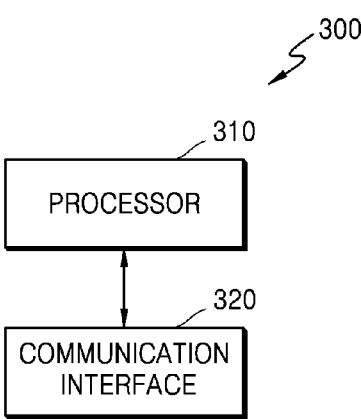
FIG. 3 is a block diagram illustrating an electronic device according to an embodiment of the present disclosure.

FIG. 3 is a block diagram illustrating an electronic device according to an embodiment of the present disclosure. An electronic device 300 illustrated in FIG. 3 may correspond to the electronic device 200 described in FIG. 2, and accordingly, descriptions overlapped with the descriptions of FIGS. 1 and 2 are omitted.

Referring to FIG. 3, the electronic device 300 provides information on treatment and includes a communication interface 320 that receives data from an external device and a processor 310 that executes at least one instruction to generate information on dental treatment.

Specifically, the processor 310 of the electronic device 300 according to the embodiment of the present disclosure may execute the at least one instruction to acquire a design model representing an artifact that is manufactured based on a first scan model acquired by scanning a target object and is attached to the target object, acquire a second scan model generated by scanning the artifact manufactured based on the design model, align the first scan model and the second scan model, identify an incorrectly-made part in the second scan model based on the aligned result, and generate information corresponding to the identified part on the second scan model.

Alternatively, the processor 310 of the electronic device 300 according to the embodiment of the present disclosure executes the at least one instruction acquire a design model representing an artifact that is manufactured based on a first scan model acquired by scanning a target object and is attached to the target object, acquire a second scan model generated by scanning the artifact manufactured based on the design model, align the design model and the second scan model, identify an incorrectly-made part in the second scan model based on the aligned result, and generate information corresponding to the identified part on the second scan model.

Here, in attaching an artifact to a target object, the 'attaching' may indicate not only a case of attaching the artifact to the target object by using an adhesive material, but also a case of closely coupling the target object to the artifact without using the adhesive material.

In the embodiment of the present disclosure, the first scan model may indicate a model acquired by scanning a target object. In addition, the second scan model may indicate a model acquired by scanning an artifact to be attached to or coupled to a target object. In addition, the design model may indicate a three-dimensional model generated by modeling an artifact to be attached or coupled to a target object.

Specifically, the processor 310 may align the first scan model coupled to the design model, and the second scan model and may identify an incorrectly-made part based on the aligned result.

Specifically, the processor 310 may align the first scan model and the second scan model based on a line corresponding to a boundary surface where a target object is coupled to an artifact. For example, a target object may be a tooth or an abutment of an implant. In this case, the artifact is a crown, and the 'line corresponding to the boundary surface where the target object is coupled to the artifact' may be a margin line. Specifically, a margin of a tooth may indicate an interface between the tooth and an artifact (for example, a crown) to be attached to the tooth. A line formed by the interface may be referred to as a margin line. For example, there may be a margin on a tooth, and a crown to be attached to a tooth may also have a margin. Therefore, it may be said that a tooth has a margin line and a crown also has a margin line.

For example, the processor 310 may align the first scan model coupled to the design model, and the second scan model based on a first line (for example, a margin line of the design model) corresponding to a boundary of a cut surface of the target object (for example, an abutment tooth cut for crown treatment) in the design model, and a second line (for example, a margin line of a crown) corresponding to a boundary of a cut surface of the target object in the second scan model.

Specifically, the processor 310 performs a preset operation by executing at least one instruction. Specifically, the processor 310 may control imaging (or scanning) of the oral cavity, an operation of acquiring an image or data of the oral cavity, an operation of processing the acquired image or data, and/or an operation of transmitting the acquired image or data.

In addition, when it is described that the processor 310 performs a preset operation, it means not only a case in which the processor 310 executes at least one instruction to directly perform the preset operation, but also a case in which the processor 320 controls other structural elements to perform the preset operation.

Specifically, the processor 310 may include a random access memory (RAM) (not illustrated) that stores signals or data transmitted from the outside or is used as a storage region corresponding to various operations performed by the electronic device 200, a read-only memory (ROM) (not illustrated) storing a control program and/or a plurality of instructions for controlling the electronic device 200, and at least one processor (not illustrated) (hereinafter, referred to as an 'internal processor') executing at least one instruction. Specifically, the processor 310 may be include at least one internal processor and a memory device (for example, RAM, ROM, or so on) storing at least some of programs, instructions, signals, and data to be processed or used by the internal processor.

In addition, the processor 310 may include a graphics processing unit (GPU) (not illustrated) for processing graphics corresponding to video. In addition, the processor 310 may be implemented as a system on chip (SoC) in which a core (not illustrated) is integrated with a GPU (not illustrated). In addition, the processor 310 may include a single core or multiple cores. For example, the processor 310 may include a dual core, a triple core, a quad core, a hexa core, an octa core, a deca core, a dodeca core, a hexadecimal core, or so on.

In addition, the processor 310 may include a field-programmable gate array (FPGA), which is a semiconductor device including a designable logic device and a programmable internal circuit, and perform high-speed image processing by using the FPGA.

In addition, performing operations, such as 'acquisition', 'aligning', 'identifying', and 'generating' by the processor 310 means that the processor 310 directly performs the operations by executing at least one instruction, but also the processor 320 controls other structural elements to perform the operations.

The communication interface 320 may communicate with at least one external device (not illustrated) through a wired or wireless communication network. Here, the external device (not illustrated) may include the scanner 100, the scanner 101, the oral diagnosis device 120, and/or the server 170 described in FIG. 2.

Specifically, the communication interface 320 may include at least one short-range communication module (not illustrated) that performs communication according to a communication standard, such as the Bluetooth, Wi-Fi, BLE, NFC/RFID, Wi-Fi Direct, UWB, or ZigBee.

In addition, the communication interface 320 may further include a telecommunication module (not illustrated) that communicates with a server (not illustrated) for supporting telecommunication according to a telecommunication standard. Specifically, the communication interface 320 may include a telecommunication module (not illustrated) that performs communication through a network for Internet communication. In addition, the communication interface 320 may include a telecommunication module (not illustrated) that performs communication through a communication network conforming to communication standards, such as third generation (3G), fourth generation (4G), fifth generation (5G), and/or sixth generation (6G).

In addition, the communication interface 320 may include at least one port (not illustrated) connected to an external device (for example, a scanner or so on) through a wired cable to communicate with the external device. For example, the communication interface 320 may include a cable connection port, such as a high-definition multimedia interface (HDMI) port (not illustrated). Accordingly, the communication interface 320 may communicate with a wired external device through at least one port (not illustrated).

For example, the communication interface 320 may communicate with a scanner (for example, the scanner 100 or the scanner 101 in FIG. 2) (not illustrated in FIG. 3) under control by the processor 310. In another example, the communication interface 320 may communicate with the oral diagnosis device 120 in FIG. 2 or the server 170 in FIG. 2 connected thereto through a wired or wireless communication network under control by the processor 310.

In the embodiment of the present disclosure, the processor 310 may generate desired information (for example, 'information corresponding to the identified part on the second scan model', or so on) based on data received through the communication interface 320.

Figure 4:
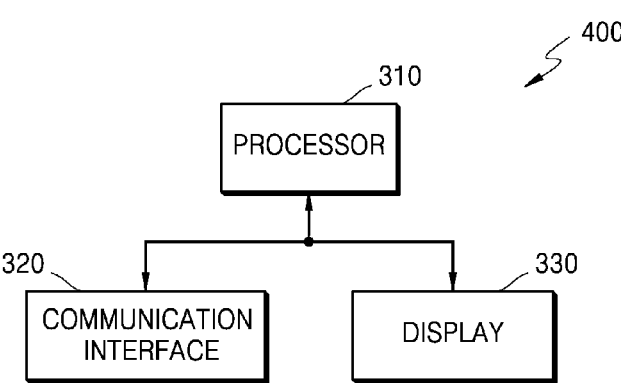
FIG. 4 is a block diagram illustrating another electronic device according to an embodiment of the present disclosure.

FIG. 4 is another block diagram illustrating an electronic device according to an embodiment of the present disclosure.

Referring to FIG. 4, an electronic device 400 further includes a display 330 compared to the electronic device 300 illustrated in FIG. 3.

The display 330 displays a screen. Specifically, the display 330 may display a preset screen according to control by the processor 310. Specifically, the display 330 may display a user interface screen providing information for dental treatment. Specifically, the display 330 may display a user interface screen including information corresponding to an incorrectly-made part in the second scan model. Alternatively, the display 330 may display a user interface screen including at least one of the first scan model, the design model, and the second scan model.

Specifically, the display 330 may output a user interface screen corresponding to video data through an internally included display panel (not illustrated) such that a user may visually recognize the video data corresponding to the user interface screen.

Figure 5:
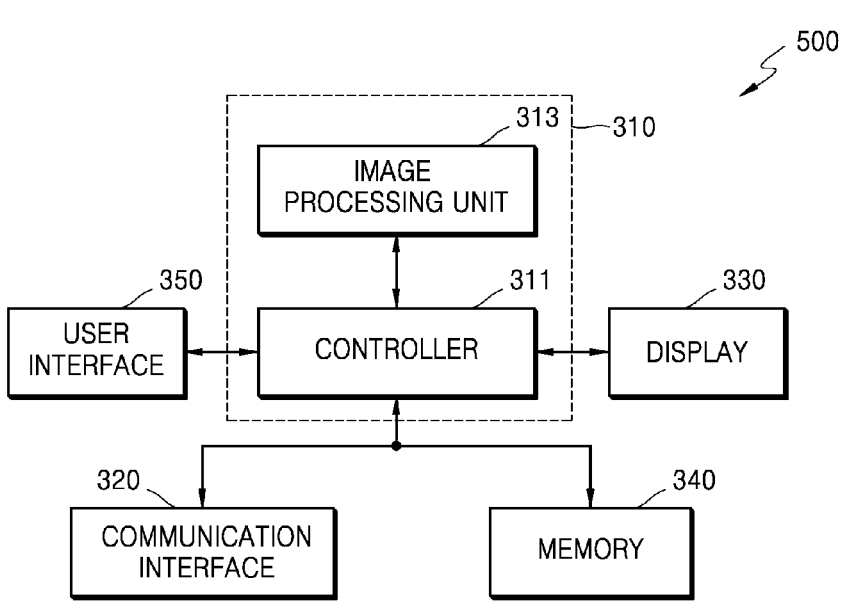
FIG. 5 is a block diagram illustrating another electronic device according to an embodiment of the present disclosure.

FIG. 5 is another block diagram illustrating an electronic device according to an embodiment of the present disclosure. An electronic device 500 illustrated in FIG. 5 may correspond identically to the electronic device 300 or the electronic device 400 respectively illustrated in FIG. 3 and FIG. 4. Referring to FIG. 5, the electronic device 500 may further include at least one of a memory 340 and a user interface 350 compared to the electronic device 400. The same reference numerals in the accompanying drawings denote the same configurations, and accordingly, redundant descriptions thereof are omitted.

The memory 340 may store at least one instruction. In addition, the memory 340 may store at least one instruction executed by the processor 310. In addition, the memory 340 may store at least one program executed by the processor 310. In addition, the memory 340 may store data (for example, raw data acquired by performing a scan operation, tooth data, and so on) received from at least one external device (not illustrated). Alternatively, the memory 340 may store oral images three-dimensionally representing the oral cavity.

The user interface 350 may receive a user input for controlling the electronic device 500. The user interface 350 may include a user input device including a touch panel for sensing a user's touch, a button for receiving a user's push operation, a mouse or a keyboard for indicating or selecting a point on a user interface screen, and so on, but is not limited thereto.

In addition, the user interface 350 may include a voice recognition device (not illustrated) for voice recognition. For example, the voice recognition device (not illustrated) may be a microphone and receive a user's voice command or voice request. Accordingly, the processor 310 may control an operation corresponding to the voice command or the voice request.

In addition, the processor 310 may include a controller 311 and an image processing unit 313.

Specifically, the controller 311 controls all operations of the electronic device 500. For example, the controller 311 may generally control internal configurations by executing one or more instructions and/or programs stored in the memory 340 or the controller 311.

The image processing unit 313 may perform operations for generating and/or processing images. Specifically, the image processing unit 313 may receive raw data acquired from a scanner (not illustrated) and generate an image or a model representing the oral cavity based on the received data. Alternatively, the image processing unit 313 may generate an image to be output through a user interface screen.

For example, the image processing unit 313 may generate a first scan model that three-dimensionally represents a tooth based on the data acquired by scanning the tooth or an impression body of the tooth by using a scanner (not illustrated). In addition, the image processing unit 313 may generate a second scan model three-dimensionally representing an artifact based on data acquired by scanning the artifact by using a scanner (not illustrated).

Alternatively, the image processing unit 313 may generate an image corresponding to a user interface screen. For example, the image processing unit 313 may generate an image in which information corresponding to an incorrectly-made part of the second scan model is displayed in the second scan model and which corresponds to a user interface screen, under control by the controller 311.

Hereinafter, detailed operations performed by the electronic devices 300, 400, or 500 according to embodiments of the present disclosure will be described with reference to FIGS. 6 to 21.

An electronic device (for example, the electronic device 200, 300, 400, or 500) and a method of operating the electronic device, according to the embodiments of the present disclosure may reduce discomfort experienced by dental technicians, dentists, and patients when an artifact inserted into or attached to a tooth is incorrectly manufactured and may increase the efficiency of dental treatment.

Specifically, a case, in which a patient's tooth is damaged and receives a crown treatment, is described as an example. In this case, a patient visits a dentist for dental treatment, and a dentist removes a damaged part of a tooth. Then, the tooth is scanned to make a crown to be attached to the tooth from which the damaged part is removed. In addition, a crown model may be generated by inputting data acquired by scanning the tooth to a computer aided design (CAD) system. Then, an actual crown corresponding to the generated crown model is manufactured. After the crown is manufactured, the patient has to visit the dentist again. The dentist may complete a crown treatment by attaching the crown to the tooth such that the manufactured crown covers the damaged tooth of the patient.

In the above example, the crown may be incorrectly manufactured. The crown has to be manufactured to cover the patient's tooth (for example, an abutment tooth) without causing a collision and has to be manufactured so as not to collide with adjacent teeth or form a too large gap therebetween. For example, there may be a case in which the crown is manufactured larger than the patient's tooth and collides with adjacent teeth, a case in which the crown is manufactured to be smaller than the patient's tooth so as not to cover the patient's tooth, a case in which the crown is manufactured to be smaller than the intended size or thickness such that a large gap is formed between the crown and an adjacent tooth, a case in which at least a part of the patient's tooth collides with the inside of the crown, and so on.

In this case, there is an inconvenience that a crown has to be manufactured again and a patient has to visit the dentist again. In addition, the dentist has to repeatedly perform crown treatment that would have been terminated if a crown had not been manufactured incorrectly.

As described above, when an artifact that is precisely attached or coupled to a tooth for dental treatment is incorrectly manufactured, a dentist, a dental technician, and a patient experience discomfort.

In the embodiment of the present disclosure, in order to reduce the inconvenience, whether an artifact is manufactured incorrectly may be checked before the artifact that is precisely attached or coupled to a tooth for dental treatment is attached to a patient's tooth.

Figure 6:
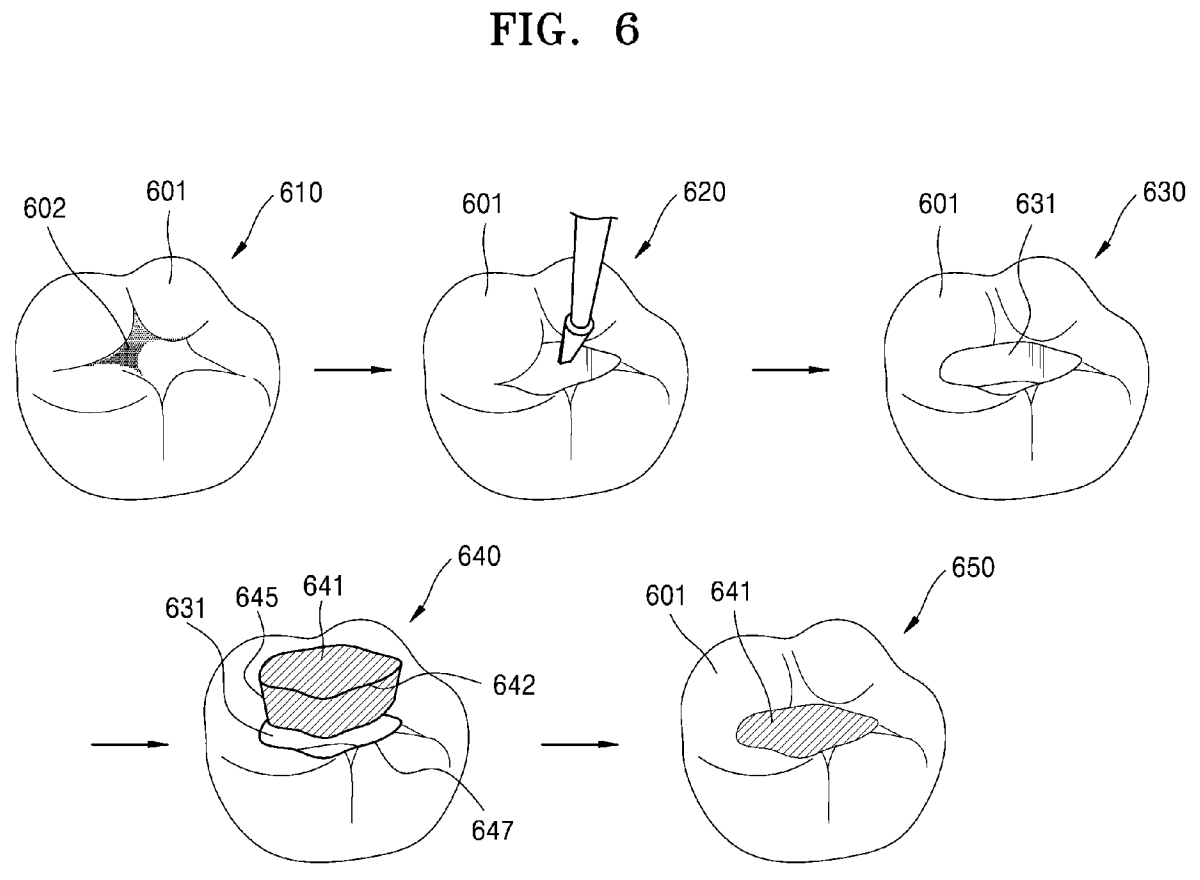

FIG. 6 illustrates views of inlay treatment.

In the embodiment of the present disclosure, an artifact that is attached or coupled to a patient's tooth for dental treatment may be an inlay. FIG. 6 illustrates views of inlay treatment that is dental treatment for an inlay.

A portion 610 in FIG. 6 illustrates a case in which a cavity 602 is formed in an upper central portion of a tooth 601 that is a target of dental treatment.

Subsequently, referring to a portion 620 in FIG. 6, a dentist may remove a part of the tooth 601 in which the cavity 602 is formed. A portion 630 in FIG. 6 represents the tooth 601 from which the cavity 602 is removed. A dentist may make an inlay 641 to be inserted into and attached to a partial region 631 of the tooth from which the cavity is removed by scanning the tooth 601 from which the cavity 602 is formed by using a scanner (not illustrated) or by performing impression.

Subsequently, referring to a portion 640 and a portion 650 in FIG. 6, the inlay treatment may be completed by inserting and attaching the made inlay 641 to the partial region 631 of the tooth from which the cavity is removed.

Figure 7A:
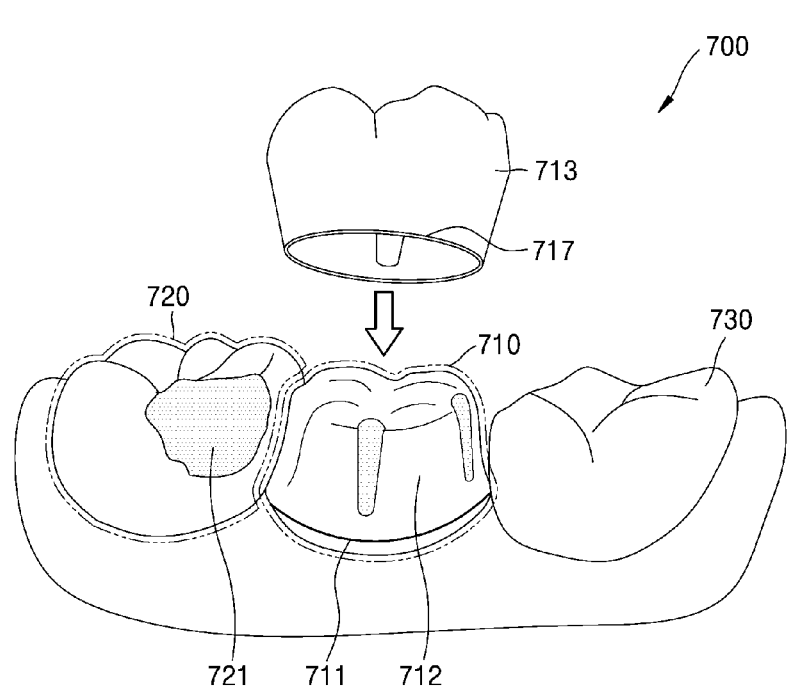
FIG. 7A is a view illustrating crown treatment.

FIG. 7A is a view illustrating crown treatment.

Referring to FIG. 7A, a tooth that is a target of crown treatment may be a tooth 720 of which internal nerve is damaged due to a partial breakage or a tooth 710 of which internal nerve is damaged due to cavity. Similarly to the description made with reference to FIG. 6, the tooth 710 may be trimmed in a form in which the damaged tooth is removed or etched and then the tooth 710 is covered with a crown.

In addition, a crown 713 is manufactured to completely cover the tooth 710 by scanning the trimmed tooth 710 by using a scanner (not illustrated) or by performing impression. Here, the trimmed tooth 710 may be referred to as an 'abutment tooth'. The crown 713 to be attached to the abutment tooth 710 has to be manufactured without a portion causing a collision with the abutment tooth or a portion misaligned with the abutment tooth in the inside. For example, an inner surface of a crown that comes into contact with the abutment tooth should have no part that causes a collision with the abutment tooth or is misaligned with the abutment tooth. In addition, a crown attached to the abutment tooth 710 should not collide with at least one of the teeth 720 and 730 adjacent to the abutment tooth. In addition, a gap or an interval between the crown attached to the abutment tooth 710 and at least one of the teeth 720 and 730 adjacent to the abutment tooth should not be too large. When the gap between the crown attached to the abutment tooth 710 and at least one of the teeth 720 and 730 adjacent to the abutment tooth is increased, food debris may get caught in at least one of the teeth 720 and 730 adjacent to the crown to cause gum inflammation or tooth decay.

Figure 7B:
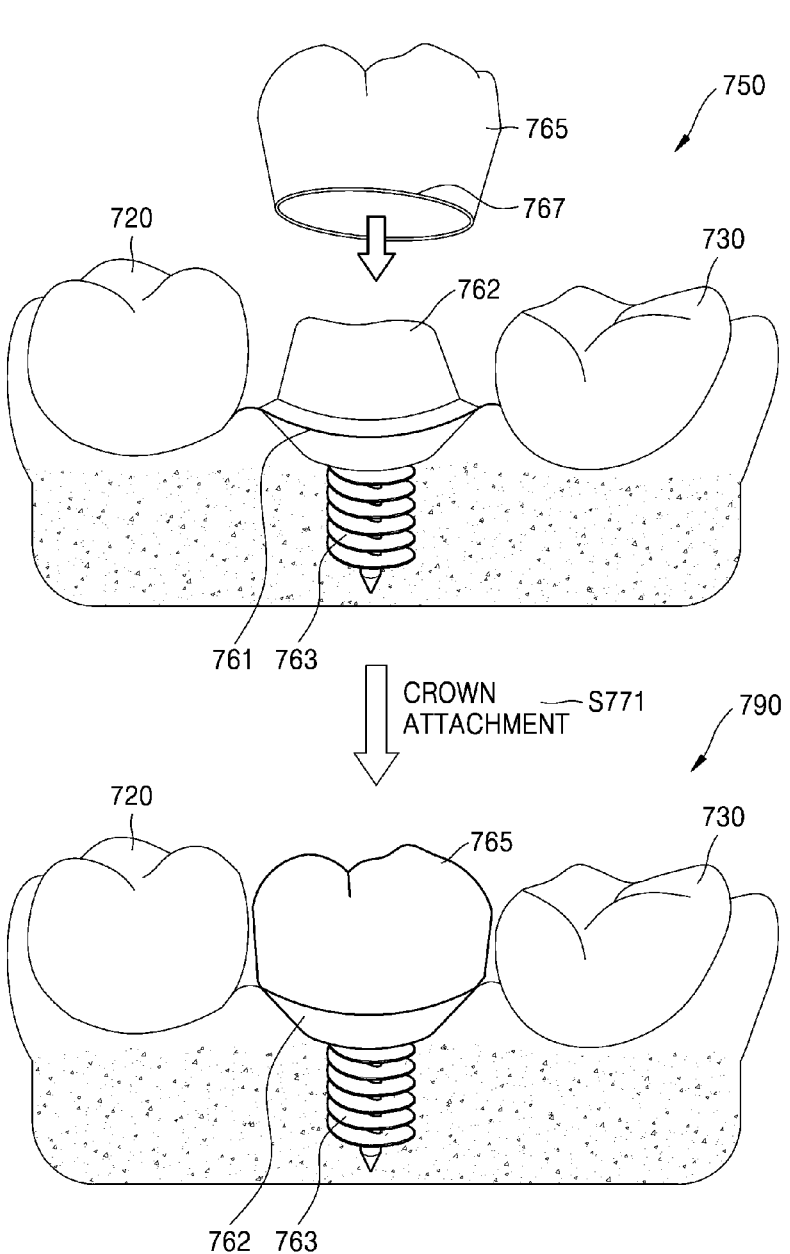
FIG. 7B is a view illustrating implant treatment.

FIG. 7B is a view illustrating implant treatment. In addition, in FIG. 7B, the same configurations as in FIG. 7A are denoted by the same reference numerals, and accordingly, redundant descriptions thereof are omitted.

The implant treatment of FIG. 7B is similar to the crown treatment described with reference to FIG. 7A but is different from the crown treatment in that an abutment 762 of implant is used instead of the abutment tooth 710 described in FIG. 7A. In addition, although FIG. 7A illustrates, as an example, a case in which the adjacent tooth 720 on the left side of the abutment 762 is a broken tooth, FIG. 7B illustrates, as an example, a case in which the adjacent tooth 720 is a normal tooth.

Referring to a region 750 of FIG. 7B, when performing implant treatment, a fixture 763 is inserted into the gum, and the abutment 762 is coupled to the fixture 763. In performing the implant treatment, the fixture 763 may serve as a root of a tooth, and the abutment 762 may serve as an abutment tooth. In addition, a design model for a crown 765 coupled to the abutment 762 may be generated based on a first scan model acquired by scanning the oral cavity into which the abutment 762 is inserted or scanning the abutment 762. The crown 765 coupled to the abutment 762 is also referred to as an implant crown, but is referred to as the 'crown 765' hereinafter for the sake of convenience of naming. Then, when the crown 765 is manufactured by using the generated design model, the crown 765 may be attached to the abutment 762 (S771). Specifically, the crown 765 may be attached to the abutment 762 such that a margin line 767 of the crown 765 come into close contact with a margin line 761 of the abutment 762. In FIG. 7B, the abutment 762 may be customized to a patient's oral structure or a patient's tooth.

Referring to a region 790, an oral cavity, in which implant treatment is completed by attaching the crown 765 to the abutment 762, is illustrated.

Figure 8A:
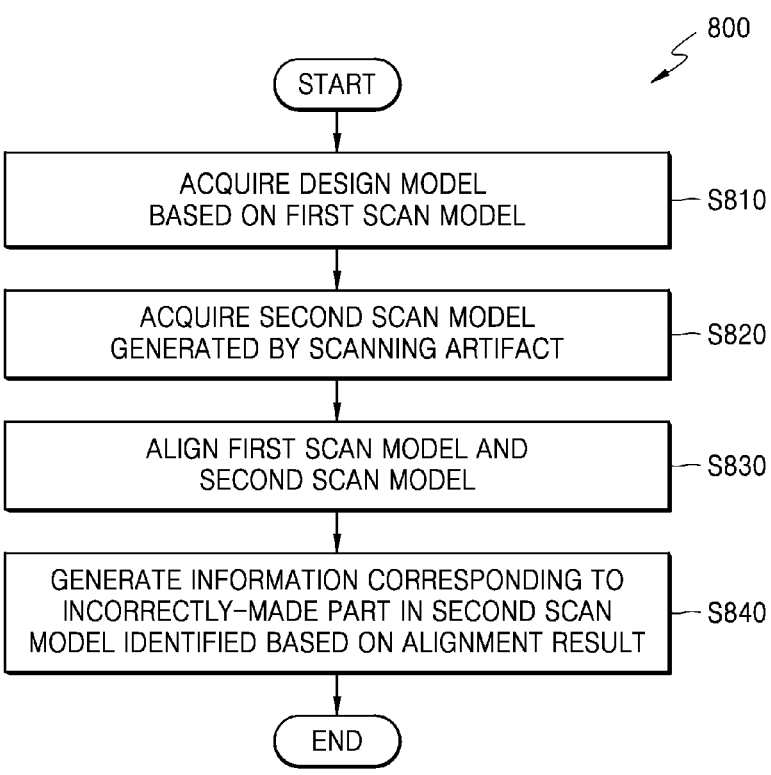
FIG. 8A is a flowchart illustrating a method of providing information for dental treatment according to an embodiment of the present disclosure.

Hereinafter, a case, in which an artifact used for dental treatment is an inlay or a crown described with reference to FIGS. 6 to 7B, is described as an example. In addition, in the embodiment of the present disclosure, a crown may refer to the crown 713 attached to the abutment 710 illustrated in FIG. 7A and may also refer to the crown 765 attached to the abutment 762 illustrated in FIG. 7B. For the sake of convenience of description, a case, in which a crown to be described below is the crown 713 attached to the abutment 710 illustrated in FIG. 7A, is described as an example. FIG. 8A is a flowchart illustrating a method of providing information for dental treatment according to an embodiment of the present disclosure. In addition, FIG. 8A may be a diagram illustrating a flow of operations performed by the electronic device 200, 300, 400, or 500 according to an embodiment of the present disclosure. In FIG. 8A, a case, in which a method 800 of providing information for dental treatment is performed by the electronic device 400 illustrated in FIG. 4, is described as an example.

The method 800 of providing information for dental treatment according to the embodiment of the present disclosure acquires a design model that is generated based on a first scan model acquired by scanning a target object (for example, a tooth, an impression body corresponding to the tooth, or so on) and represents an artifact to be attached to the target object (S810). Specifically, operation S810 may be performed by the processor 310.

Here, the first scan model may be a three-dimensional model representing a target object that is a target of dental treatment. In addition, the target object may be a tooth that is a target of dental treatment. For example, when a crown treatment is performed on a tooth, the tooth may be the abutment tooth 710 illustrated in FIG. 7A.

Alternatively, the target object may be an implant tooth for implant treatment described with reference to FIG. 7B. For example, when the implant treatment is performed, the abutment 762 corresponding to the abutment tooth 710 may be used. In this case, the first scan model may be acquired by scanning the abutment 762 coupled to a fixture to perform implant treatment. In addition, the crown 765 illustrated in FIG. 7B may be manufactured based on the first scan model acquired by scanning the abutment 762. In addition, a second scan model may be acquired by scanning the crown 765.

For the sake of convenience of description, a case in which a target object is a tooth is taken as an example to be illustrated and described in the drawings below in addition to FIG. 8A. Here, the tooth may be the abutment tooth 710 illustrated in FIG. 7A. Alternatively, a target tooth may indicate the abutment 762 corresponding to the abutment tooth 710 illustrated in FIG. 7B. Hereinafter, a case, in which a tooth to be described below is the abutment tooth 710 illustrated in FIG. 7A, is described as an example for the sake of convenience of description.

Specifically, the scanner 100 or the scanner 101 illustrated in FIG. 1 or 2 may scan a target object. A target object to be scanned may be a tooth, an artifact corresponding to a tooth, an impression body modeled on a tooth, a plaster model corresponding to a tooth, or so on.

Hereinafter, a case, in which a target object (for example, the abutment tooth 710 illustrated in FIG. 7A) is scanned by using the scanner 100 illustrated in FIG. 1, is described as an example.

Specifically, the scanner 100 may scan a tooth that is a target of dental treatment to acquire scan data, for example, raw data. The scanner 100 may generate a three-dimensional model or a three-dimensional image corresponding to a tooth that is a target of dental treatment by using the raw data. Hereinafter, for the sake of convenience of description, an image or a model three-dimensionally representing a target object is collectively referred to as a 'model'.

In addition, hereinafter, for the sake of convenience of description, a model generated by scanning a tooth to be treated and to which an artifact is to be attached is referred to as a 'first scan model'. For example, the first scan model may be acquired by scanning a tooth trimmed to attach an artifact thereto. For example, as illustrated in the portion 630 of FIG. 6, the first scan model may be acquired by scanning a tooth including the region obtained by etching a tooth portion to which an artifact is coupled or attached. In another example, as described with reference to FIG. 7A, the first scan model may be acquired by scanning a tooth to which the crown 713 is coupled or attached and which is trimmed to attach the crown thereto. In another example, as described with reference to FIG. 7B, the first scan model may be acquired by scanning the abutment 762.

Alternatively, the data acquired by the scanner 100, for example, raw data, or data corresponding thereto may be transmitted to at least one of the oral diagnosis device 120 and the server 170. Then, at least one of the oral diagnosis device 120 and the server 170 may generate the first scan model based on the received data. In addition, at least one of the oral diagnosis device 120 and the server 170 may transmit the generated first scan model to the electronic device 400. Then, the electronic device 400 may receive the first scan model generated by at least one of the oral diagnosis device 120 and the server 170 through the communication interface 320. In the example described above, the processor 310 of the electronic device 400 may acquire the first scan model by receiving the first scan model from at least one of the oral diagnosis device 120 and the server 170.

Alternatively, the data acquired by the scanner 100, for example, raw data, or data corresponding thereto may be transmitted to the electronic device 400. Here, the data acquired by scanning a tooth that is a target of dental treatment may be transmitted from the scanner 100 to the electronic device 400. Alternatively, the data acquired through scanning may be transmitted from at least one of the oral diagnosis device 120 and the server 170 to the electronic device 400. Then, the electronic device 400 may receive raw data acquired through scanning through the communication interface 320 or data corresponding thereto and generate the first scan model based on the received data.

As described above, the electronic device 400 may generate the first scan model based on data received from an external device (for example, at least one of the scanner 100, the scanner 101, the oral diagnosis device 120, and the server 170) or may receive the first scan model from an external device (for example, at least one of the scanner 100, the scanner 101, the oral diagnosis device 120, and the server 170).

In the embodiments of the present disclosure, the impression body may be an orthodontic device including a bracket and a wire that may be coupled to, attached to or inserted into a tooth, a gingiva, at least a part of the oral cavity, and/or the oral cavity, a dental restoration member including an implant, an artificial tooth, a crown, an inlay, and an onlay, and so on, an orthodontic support member inserted into the oral cavity. Alternatively, the artifact may be an orthodontic device, a dental restoration member including an implant, an artificial tooth, a crown, an inlay, an onlay, and so on, a plaster model used to make an orthodontic support member inserted into the oral cavity, an impression body, or so on.

Hereinafter, a case, in which the 'artifact' in operation S810 is a crown, is described as an example.

Then, the electronic device 400 may acquire a design model representing an artifact to be attached to a tooth based on the acquired first scan model (S810). Specifically, in operation S810, a design model three-dimensionally representing an artifact to be attached or coupled to a tooth may be generated through a design based on a computer operation based on the first scan model. Here, an operation of generating the design model may be performed by the processor 310. Alternatively, the operation of generating a design model may be performed by an external device. In this case, the design model generated by the external device may be transmitted to the electronic device 400.

For example, in operation S810, a design model obtained by three-dimensionally modeling an artifact to be attached to the tooth may be acquired through a computer-aided design (CAD) based on the first scan model. A device or a system that designs a target object according to a CAD may be referred to as a CAD system.

Specifically, the CAD system may generate a design model three-dimensionally representing an artifact by designing an artifact to be attached to the trimmed tooth based on the first scan model.

Subsequently, in the method 800 of providing information for dental treatment, a second scan model generated by scanning an artifact manufactured based on the design model is acquired (S820). Specifically, operation S820 may be performed by the processor 310.

Specifically, the electronic device 400 may generate the second scan model or acquire the second scan model by receiving the second scan model from an external device (for example, at least one of the scanner 100, the scanner 101, the oral diagnosis device 120, and the server 170).

For example, the scanner 100 in FIG. 2 may acquire raw data by scanning an artifact. That is, the scanner 100 may scan an actually manufactured artifact. In addition, similarly to the description of operation S810, the scanner 100 may generate a second scan model based on the acquired raw data.

Alternatively, the raw data acquired by scanning an artifact by using the scanner 100 may be transmitted to at least one of the oral diagnosis device 120 and the server 170. Then, at least one of the oral diagnosis device 120 and the server 170 may generate the second scan model based on the received data. In addition, at least one of the oral diagnosis device 120 and the server 170 may transmit the generated second scan model to the electronic device 400. Then, the electronic device 400 may receive the second scan model generated by at least one of the oral diagnosis device 120 and the server 170 through the communication interface 320. In the examples described above, the processor 310 of the electronic device 400 may acquire the second scan model by receiving the second scan model from at least one of the oral diagnosis device 120 and the server 170.

Alternatively, data acquired by the scanner 100 scanning an artifact, for example, raw data, or data corresponding thereto may be transmitted to the electronic device 400. Here, the data acquired by scanning the artifact may be transmitted from the scanner 100 to the electronic device 400. Alternatively, the data acquired by scanning the artifact may also be transmitted from at least one of the oral diagnosis device 120 and the server 170 to the electronic device 400. Then, the electronic device 400 may receive raw data acquired by scanning an artifact or data corresponding thereto through the communication interface 320 and generate the second scan model based on the received data. In the examples described above, the electronic device 400 may acquire the second scan model by generating the second scan model based on the received data.

Subsequently, in the method 800 of providing information for dental treatment, the first scan model acquired in operation S810 and the second scan model acquired in operation S820 are aligned (S830).

Specifically, operation S830 may be performed by the processor 310. In the embodiment of the present disclosure, the second scan model acquired by scanning an artifact and the first scan model acquired by scanning an abutment tooth may be aligned and compared with each other to identify a region colliding with the abutment tooth within the artifact.

Specifically, in operation S830, the first scan model and the second scan model may be aligned based on a line corresponding to a boundary surface where a target object is coupled to an artifact. Here, a line corresponding to the boundary surface where the target object is coupled to the artifact may be a margin line. Specifically, when the target object is a tooth or an abutment of an implant and the artifact is a crown, a 'line corresponding to the boundary surface where the target object is coupled to the artifact' may be a margin line.

Specifically, in operation S830, when a tooth that is a target of dental treatment, the first scan model acquired in operation S810 and the second scan model acquired in operation S820 may be aligned based on a line (for example, a margin line) corresponding to a boundary of a cut surface (S830).

As in the examples illustrated in FIGS. 6 to 7A, a tooth that is a target of dental treatment may be cut to attach an artifact thereto. Alternatively, the tooth that is a target of dental treatment may be partially cut to remove a portion where a cavity exists. In addition, an artifact for dental treatment, for example, an inlay, an onlay, a crown, or so on may be attached to the cut portion. In addition, a cross-section of a tooth cut for treatment may be referred to as a 'cutting surface' or a 'cut surface'. In addition, a 'boundary of the cut surface' may indicate a boundary where the cutting surface meets a non-cut surface within a tooth. For example, the 'boundary of the cut surface' in a trimmed tooth for crown treatment may be a margin line.

As in the example illustrated in FIG. 7B, when the dental treatment is implant treatment, an artifact may be the crown 765 of the implant, and the crown 765 may be coupled to the abutment 762. In this case, a line corresponding to a boundary surface where the crown 765 is coupled to the abutment 762 may be a margin line.

Specifically, referring to FIG. 6, when a tooth is a target of inlay treatment, the region 631 may be cut, and there may be a cutting surface at the center of an upper surface of a tooth. In the example illustrated in FIG. 6, the 'cutting surface' for attaching an artifact for dental treatment may be a surface on which the region 631 illustrated at the portion 630 is formed. The 'line corresponding to a boundary of a cut surface' may be at least one of the line 647 and the line 642. Considering an artifact, the 'line corresponding to the boundary of the cut surface' within a tooth for dental treatment may be the 642 line. Alternatively, considering the cut tooth, the 'line corresponding to the boundary of the cut surface' within the tooth for dental treatment may be the line 647.

Specifically, when an artifact is a crown as in the crown treatment described with reference to FIG. 7A, the 'line corresponding to the boundary of the cut surface' may be a line 711. Specifically, when an artifact is a crown, the tooth is coupled to the crown in a form in which the crown surrounds a cut surface of the tooth. In this case, a 'boundary of a cut surface' in the tooth may indicate a line which is a boundary between the cut region and the other region area after the tooth is cut, that is, a 'margin line' which is a line forming a margin. In addition, the 'boundary of the cut surface' in the tooth may indicate a line where an end line 717 of the crown is in contact with the tooth. In the example illustrated in FIG. 7A, the 'boundary of the cut surface' in the tooth may be the line 711.

Hereinafter, for the sake of convenience of description, a case, in which an artifact is the crown 713 illustrated in FIG. 7A and a 'line corresponding to a boundary surface where a target object is coupled to an artifact' is a 'margin line', is taken as an example to be illustrated and described.

Specifically, operation S830 may include an operation of aligning the first scan model coupled to the design model, and the second scan model.

Specifically, in operation S830, the first scan model coupled to the design model and the second scan model may be aligned based on a margin line of a target object in the design model and a margin line of the target object in the second scan model.

In addition, operation S830 may be performed in two operations.

Specifically, the processor 310 may couple the first scan model to the design model. In addition, the processor 310 may first align a design model coupled to the first scan model, and the second scan model and may second align the primarily aligned design model and the second scan model based on a margin line. Specifically, the processor 310 may roughly align the design model and the second scan model by comparing and analyzing the design model and the second scan model as a whole and then precisely align the design model and the second scan model by using a margin line. The two-step alignment operation is described below in detail with reference to FIG. 15.

In addition, the alignment operation in operation S830 may be performed through a neural network operation based on an artificial intelligence (AI) technology. Here, the neural network may optimize weight values in the neural network by receiving two mutually couplable objects and training learning data (for example, a first scan model and a second scan model) such that the two input objects are aligned. In addition, a desired result may be output by self-learning the input data through the neural network having an optimized weight value.

For example, a neural network, such as a convolutional neural network (CNN), may receive two objects of a 'first scan model' and a 'second scan model' which are to be aligned, compare and align the two input models, and output the aligned 'first scan model' and the aligned 'second scan model'. In another example, the neural network, such as the CNN, may receive two objects of a design model coupled to a 'first scan model' and a 'second scan model' which are to be aligned, compare and align the two input models, and output the aligned design model coupled to the 'first scan model' and the aligned 'second scan model'.

Hereinafter, when coupling a first scan model acquired by scanning a cut tooth (or a trimmed tooth) for dental treatment to a design model corresponding to an artifact, the design model coupled to the first scan model may be referred to as a 'coupling model' for the sake of convenience of naming, and the coupling model is described below in detail with reference to FIG. 11.

In addition, operation S830 is described below in detail with reference to FIGS. 11 to 16A.

Referring back to FIG. 8A, in the method 800 of providing information for dental treatment, an incorrectly-made part in the second scan model is identified based on the alignment result of operation S830, and information corresponding to the identified part in the second scan model is generated (S840). Specifically, operation S840 may be performed by the processor 310.

For example, operation S840 may include an operation of identifying a collision part between a tooth to which an artifact is to be attached and the artifact based on the alignment result of operation S830, and an operation of identifying the collision part as an incorrectly-made part.

Alternatively, operation S840 may include an operation of identifying a collision part between a tooth to which an artifact is to be attached and at least one tooth adjacent to the tooth based on the alignment result of operation S830, and an operation of identifying the collision part as an incorrectly-made part.

Alternatively, operation S840 may include an operation of determining whether an interval between a tooth to which an artifact is to be attached and at least one tooth adjacent to the tooth is greater than or equal to a threshold value, based on the alignment result of operation S830, and an operation of identifying a part that is greater than or equal to the threshold value as an incorrectly-made part. As described above, when a gap between a crown attached to the abutment tooth 710 and at least one of the teeth 720 and 730 adjacent to the abutment tooth 710 is increased, food debris may get caught in at least one of the teeth 720 and 730 adjacent to the crown to cause gum inflammation or tooth decay. Therefore, even when an interval between a tooth to which an artifact is to be attached and at least one tooth adjacent to the tooth exceeds a threshold value, it may be determined that the artifact is incorrectly-made.

Here, an incorrectly-made part may indicate a part of an artifact which is not manufactured in a desired form, such as, discomfort to a tooth, collision with the tooth, collision or malocclusion between a tooth to which an artifact is attached and at least one adjacent tooth, or unproper dental treatment.

Alternatively, the incorrectly-made part may indicate a part where the actually manufactured artifact is different from the design model. Because the design model indicates a computer-designed three-dimensional model based on a first scan model generated by scanning a tooth, an artifact (for example, a crown) has to be manufactured exactly the same as the design model. However, incorrect manufacture or an error may occur in the process of manufacturing the artifact. Therefore, when there is an incorrectly-made part in an artifact, the incorrectly-made part is removed from the artifact by correcting the artifact. Alternatively, when a degree of incorrection of the incorrectly-made part is so great that it is impossible to correct the incorrectly-made part, there may be a case in which a new artifact has to be manufactured.

Therefore, in the embodiment of the present disclosure, when a user performing dental treatment, such as a dentist or a dental technician needs to correct or re-manufacture an artifact due to an error in manufacturing the artifact, it is possible to generate information that enables quick and convenient recognition of an incorrectly-made part of an artifact.

Hereinafter, for the sake of convenience of naming, 'information corresponding to an incorrectly-made part' generated in operation S840 is referred to as first information.

In the second scan model acquired by scanning an artifact, the first information may include an image that distinguishes the incorrectly-made part from a correctly made part.

For example, the first information may include an image that distinguishes the incorrectly-made part from the correctly made part in the second scan model by using at least one of different colors, transparencies, patterns, symbols, figures, and texts.

Alternatively, the first information may include information on at least one of a depth, a thickness, a length, an area, and a volume of the incorrectly-made part in the second scan model.

In addition, operation S840 may be performed by using an operation through a neural network based on the AI technology described in operation S830.

For example, the 'first scan model' and the 'second scan model' aligned in operation S830 may be received through a neural network such as CNN, the two received models may be compared with each other and analyzed, a part in which the second scan model may collide with the first scan model and/or a part that needs correction may be extracted from the second scan model, and the extracted part may be output as the first information. In another example, a 'design model coupled to the first scan model' and the 'second scan model' aligned in operation S830 may be received through a neural network, such as CNN, the two received models are compared with each other and analyzed, a part in which the second scan model may collide with the first scan model and/or a part that needs correction may be extracted from the second scan model, and the extracted part may be output as the first information.

In another example, the 'first scan model' and the 'second scan model' aligned in operation S830, and location and arrangement information of teeth adjacent to a tooth that is a target of dental treatment may be received through a neural network, such as CNN, the received models and information may be compared with each other and analyzed, a part in which the second scan model may collide with the first scan model and/or a part that needs correction may be extracted from the second scan model, and the extracted part is may be output as the first information.

The first information is described below in detail with reference to FIGS. 18 to 21.

Figure 8B:
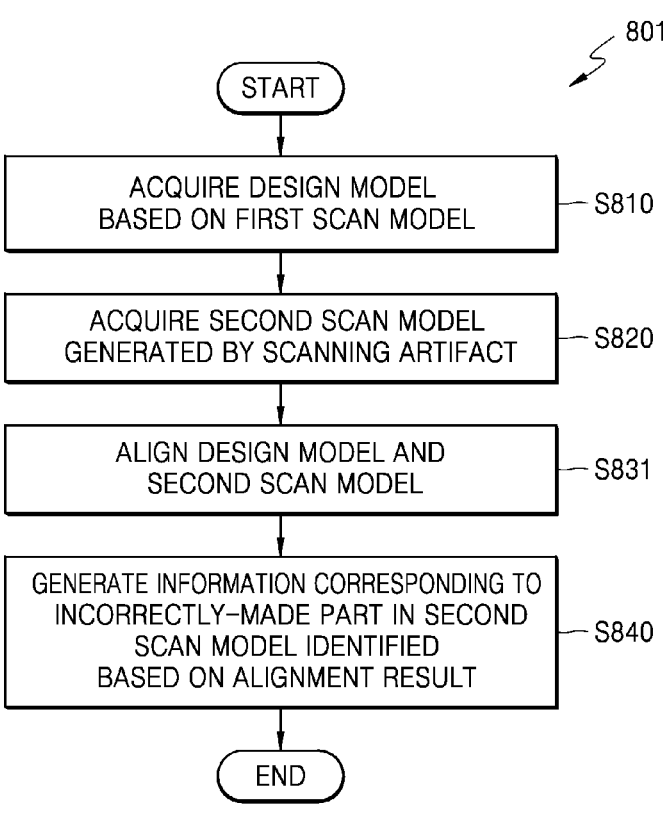
FIG. 8B is a flowchart illustrating a method of providing information for dental treatment according to another embodiment of the present disclosure.

FIG. 8B is another flowchart illustrating a method of providing information for dental treatment according to the embodiment of the present disclosure.

Referring to FIG. 8B, a method 801 of providing information for dental treatment excluding operation S831 is the same as the method 800 of providing information for dental treatment described with reference to FIG. 8A. Therefore, in FIG. 8B, configurations overlapping the configurations of FIG. 8A are denoted by the same reference numerals, and redundant descriptions thereof are omitted.

Referring to FIG. 8B, in the method 801 of providing information for dental treatment, subsequently to operation S820, the design model acquired in operation S810 and the second scan model acquired in operation S820 may be aligned (S831).

Specifically, the processor 310 may align a design model 1120 and a second scan model 1200 based on a margin line extracted from the design model 1120 and a margin line extracted from the second scan model 1200 (S830). An artifact represented by the second scan model 1200 is manufactured based on the design model 1120. Accordingly, the design model 1120 and the second scan model 1200 have similar shapes. After the design model 1120 and the second scan model 1200 are aligned, an incorrectly-made part may be identified based on the alignment result in operation S840.

Figure 9A:
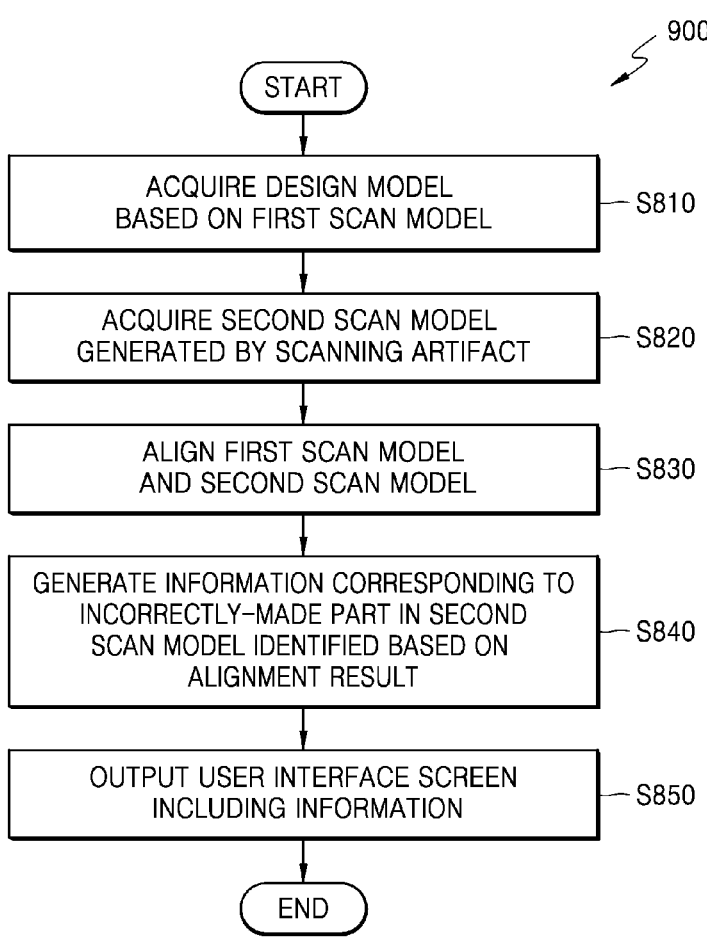
FIG. 9A is a flowchart illustrating a method of providing information for dental treatment according to another embodiment of the present disclosure.

FIG. 9A is another flowchart illustrating a method of providing information for dental treatment according to the embodiment of the present disclosure. In a method 900 of providing information for dental treatment illustrated in FIG. 9A, the same configurations as the method 800 of providing information for dental treatment described in FIG. 8A are denoted by the same reference numerals. Therefore, in describing the method 900 of providing information for dental treatment, redundant descriptions thereof are omitted.

The method 900 of providing information for dental treatment may further include operation S850 compared to the method 800 of providing information for dental treatment.

Specifically, the method 900 of providing information for dental treatment may further include an operation of outputting a user interface screen including the information generated in operation S840 (S850). Here, operation S850 may be performed, under control by the processor 310, in the display 330 included in an electronic device (for example, the electronic device 400 or 500) according to the embodiment of the present disclosure.

In addition, the method 900 of providing information may include operation S831 instead of operation S830. Specifically, the method 900 of providing information may further include operation S850 in the method 801 of providing information illustrated in FIG. 8B. Specifically, the method 801 of providing information may further include operation S850 subsequently to operation S840.

Figure 9B:
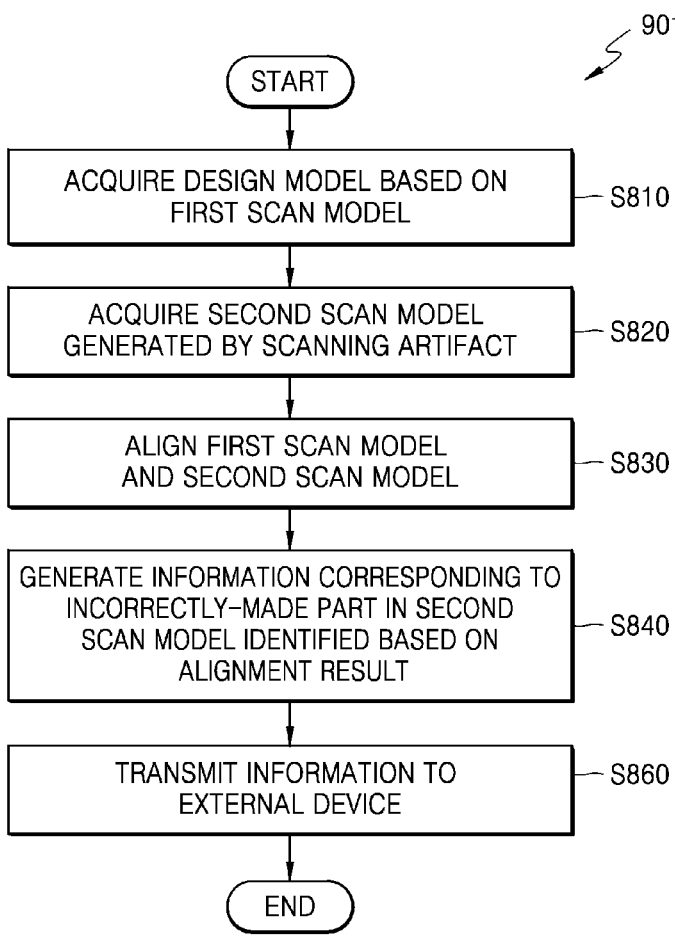
FIG. 9B is a flowchart illustrating a method of providing information for dental treatment according to another embodiment of the present disclosure.

FIG. 9B is another flowchart illustrating a method of providing information for dental treatment according to the embodiment of the present disclosure. In a method 901 of providing information for dental treatment illustrated in FIG. 9B, the same configurations as the method 800 of providing information for dental treatment described in FIG. 8A are denoted by the same reference numerals. Therefore, in describing the method 901 of providing information for dental treatment, descriptions overlapping the descriptions of the method 800 of providing information for dental treatment are omitted.

Referring to FIG. 9B, the method 901 of providing information for dental treatment may further include operation S860 compared to the method 800 of providing information for dental treatment. Here, operation S860 may be performed, under control by the processor 310, in the communication interface 320 included in an electronic device (for example, the electronic device 300, 400, or 500) according to the embodiment of the present disclosure.

Specifically, the method 901 of providing information for dental treatment may further include operation S860 of transmitting the information generated in operation S840 to an external device (not illustrated). Here, the external device (not illustrated) may be at least one of the oral diagnosis device 120 and the server 170 described in FIG. 2.

The method 800 of providing information for dental treatment described in FIG. 8A may be performed by an electronic device (for example, the electronic device 300, 400, or 500) according to the embodiment of the present disclosure. In this case, a user of an electronic device (for example, the electronic device 300, 400, or 500) according to an embodiment of the present disclosure may want to provide first information generated in operation S840 to a user in a remote location. For example, when the electronic device (for example, the electronic device 300, 400, or 500) according to the embodiment of the present disclosure is in a dental laboratory and the user of the electronic device (for example, the electronic device 300, 400, or 500) is a dental technician, the user may want to provide the first information to a dentist in a dental office located remotely from the dental laboratory. In this case, the electronic device (for example, the electronic device 300, 400, or 500) may transmit the first information to an external device (for example, the oral diagnosis device 120 used by a dentist) through the communication interface 320 (S860).

Specifically, operation S860 may be performed in response to a user input indicating a user request of the electronic device (for example, the electronic device 300, 400, or 500). For example, the user of the electronic device (for example, the electronic device 300, 400, or 500) may input, to the electronic device (for example, the electronic device 300, 400, or 500), a user input requesting that the first information acquired in operation S840 is transmitted to a certain external device (for example, an oral diagnosis device used by a dentist). Then, the electronic device (for example, the electronic device 300, 400, or 500) may perform operation S860 in response to receiving the user input.

In addition, operation S860 may be automatically performed in response to completion of operation S840. Specifically, in operation S840, when acquisition of the first information is completed, the first information may be automatically transmitted to a preset external device.

In addition, the method 901 of providing information may also further include operation S831 instead of operation S830. Specifically, the method 901 of providing information may be implemented by further including operation S860 in the method 801 of providing information illustrated in FIG. 8B. Specifically, the method 801 of providing information may further perform operation S860 subsequently to operation S840.

Conventionally, whether the crown is correctly manufactured or incorrectly manufactured may be determined only by coupling or attaching a manufactured artifact (for example, the crown) to a patient's actual tooth and actually moving or observing the tooth to which the crown is attached.

When there is an incorrectly-made part in the crown, the crown has to be sent back to a crown manufacturing facility, such as a dental laboratory, for correction. In addition, a patient has to visit a dentist again to get treatment for attaching the crown to the tooth. Therefore, there may be inconvenience in dental treatment and inefficiency in crown manufacturing due to a crown correction work, a patient's revisit to the dentist, and a dentist's repetitive treatment.

In the embodiment of the present disclosure described with reference to FIGS. 1 to 9B, an incorrectly-made part of an artifact may be identified by aligning and comparing the first scan model and the second scan model generated by scanning the actually manufactured artifact without directly attaching or coupling the actually manufactured artifact to a patient's tooth. Alternatively, an incorrectly-made part of an artifact may be identified by aligning and comparing a design model and the second scan model. Accordingly, even when an artifact, such as a crown, is incorrectly manufactured, it is possible to prevent a patient from revisiting a dentist and a dentist from repetitively treating a patient, and thus, the inconvenience and inefficiency may be prevented.

Hereinafter, operations for generating first information by using the electronic device 200, 300, 400, or 500 according to the embodiment of the present disclosure are described in detail with reference to FIGS. 10 to 21. In addition, the operations described with reference to FIGS. 10 to 21 are described by taking a case of being performed by the electronic device 300 illustrated in FIG. 3 as an example.

Figure 10:
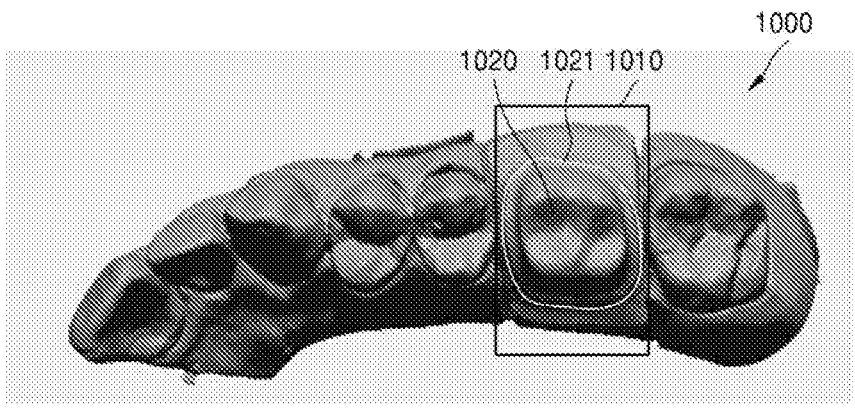
FIG. 10 is a view illustrating a first scan model acquired by scanning a target object.

FIG. 10 is a view illustrating a first scan model acquired by scanning a target object.

Referring to FIG. 10, a first scan model 1000 may be acquired by scanning a target object (for example, a patient's tooth or an impression body) that is a target of dental treatment. Hereinafter, a case in which the first scan model 1000 is acquired by scanning a tooth (specifically, an abutment tooth) is described below with reference to FIG. 10 as an example.

Referring to a region 1010, a case in which a tooth 1020 that is a target of dental treatment is etched or trimmed for crown treatment is illustrated as an example. A boundary 1021 of an etched surface of the tooth 1020 may be a margin line. In addition, the first scan model 1000 may also indicate only the region 1010 including only a tooth that is a target of dental treatment. Alternatively, the first scan model 1000 may also indicate a region including a tooth that is a target of dental treatment and at least one tooth adjacent to the tooth. Hereinafter, a case, in which the first scan model is the region 1010 including only a tooth that is a target of dental treatment, is described as an example.

Specifically, the first scan model 1010 may three-dimensionally represent a patient's teeth based on raw data acquired by scanning the patient's teeth by using a scanner (for example, the scanner 100 or 101 in FIG. 2). Hereinafter, a case, in which the first scan model 1010 is acquired by scanning the tooth 1020 by using the scanner 100 described in FIGS. 1 and 2, is described as an example.

The first scan model 1010 may be generated by at least one of the scanner 100, the oral diagnosis device 120, the server 170, and the electronic device 200, which are described in FIG. 2, according to the embodiment of the present disclosure. Specifically, the electronic device (for example, the electronic device 300) according to the embodiment of the present disclosure may acquire the first scan model 1010 by generating the first scan model 1010 or receiving the first scan model 1010 from an external device.

Figure 11:
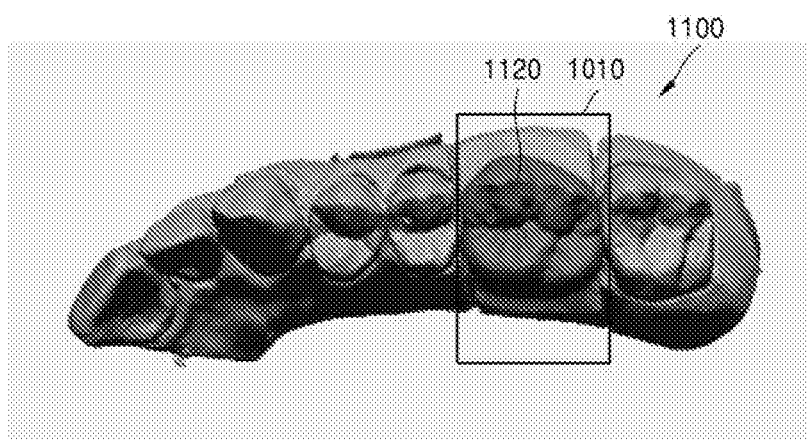
FIG. 11 is a view illustrating a design model.

FIG. 11 is a view illustrating a design model. FIG. 11 illustrates that the same configurations as in FIG. 10 are denoted by the same reference numerals, and accordingly, redundant descriptions thereof are omitted.

Referring to FIG. 11, an electronic device (for example, the electronic device 300) according to the embodiment of the present disclosure may acquire a design model 1120. Specifically, the design model 1120 may be generated based on the first scan model 1010 and may be modeled on an artifact to be attached to the tooth 1020. Specifically, the design model 1120 may be acquired by three-dimensionally modeling an artifact (for example, a crown) to be attached to the tooth 1020.

The design model 1120 may be designed and generated by using a CAD system. Here, attaching an artifact to the tooth 1020 includes not only a case in which an artificial object is completely coupled to the tooth 1020 without a gap, but also a case in which there is a slight gap between the artificial object and the tooth 1020 and a material for bonding is placed therebetween.

Referring back to FIG. 2, the design model 1120 may be acquired by at least one of the oral diagnosis device 120, the server 170, and the electronic device 200 which receive data (for example, raw data, the first scan model 1010 generated based on the raw data, data corresponding to the first scan model 1010, or so on) acquired by scanning the tooth 1020 from the scanner 100. For example, at least one of the oral diagnosis device 120, the server 170, and the electronic device 200 may receive the data acquired by scanning the tooth 1020 from the scanner 100 and may generate the design model 1120 based on the received data.

Specifically, when receiving the raw data acquired by scanning the tooth 1020, an electronic device (for example, the electronic device 200, 300, 400, or 500) according to the embodiment of the present disclosure may generate the first scan model 1010 based on the received raw data. Alternatively, an electronic device (for example, the electronic device 200, 300, 400, or 500) according to the embodiment of the present disclosure may acquire the first scan model 1010 by receiving by receiving the first scan model 1010 generated by at least one of the scanner 100, the oral diagnosis device 120, and the server 170.

Referring to FIG. 11, a coupled model 1100 representing the design model 1120 coupled to the first scan model 1010 described with reference to FIG. 10 is illustrated. Specifically, the coupled model 1100 is obtained by coupling the design model 1120 to the first scan model 1010 described with reference to FIG. 10. For example, in crown treatment, a crown is coupled to a tooth that is a target of crown treatment in a form surrounding a trimmed tooth. Accordingly, the design model 1120 in the coupled model 1100 may have a shape of a crown surrounding the trimmed teeth.

When the design model 1120 is acquired, an artifact (for example, a crown) may be manufactured based on the design model 1120. For example, a crown, which is a real object corresponding to the design model 1120, may be manufactured by using a device for manufacturing a virtual design into a real object, such as a three-dimensional printer.

Figure 12:
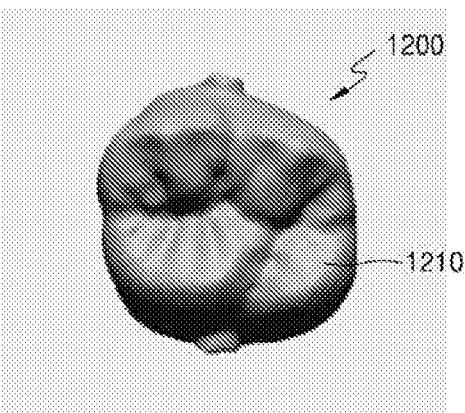
FIG. 12 is a view illustrating a second scan model acquired by scanning an artifact.

FIG. 12 is a view illustrating a second scan model acquired by scanning an artifact.

An electronic device (for example, the electronic device 200, 300, 400, or 500) according to the embodiment of the present disclosure may acquire a second scan model 1200 generated by scanning an actually manufactured artifact (for example, a crown). In FIG. 12, a case in which an artifact is a crown is illustrated as an example, and a case in which a front surface 1210 of the second scan model 1200 is displayed is illustrated as an example.

Specifically, the second scan model 1200 may be generated by 3-dimensionally modeling or restoring a scanned artifact based on raw data acquired by scanning an artifact by using a scanner (for example, the scanner 100 or 101 in FIG. 2).

Referring back to FIG. 2, the scanner 100 may transmit data (for example, raw data, the second scan model 1200 generated based on the raw data, data corresponding to the second scan model 1200, or so on) acquired by scanning an actually manufactured artefact (for example, a crown) to at least one of the oral diagnosis device 120, the server 170, and the electronic device 200. Then, at least one of the oral diagnosis device 120, the server 170, and the electronic device 200 may receive data from the scanner 100 and generate the design model 1120 based on the received data.

Specifically, when receiving raw data acquired by scanning an actually manufactured artifact (for example, a crown), an electronic device (for example, the electronic device 200, 300, 400, or 500) according to the embodiment of the present disclosure may generate the second scan model 1200 based on the received raw data. Alternatively, an electronic device (for example, the electronic device 200, 300, 400, or 500) according to the embodiment of the present disclosure may acquire the second scan model 1200 by receiving the second scan model 1200 generated by at least one of the scanner 100 or 101, the oral diagnosis device 120, and the server 170.

Figure 13:
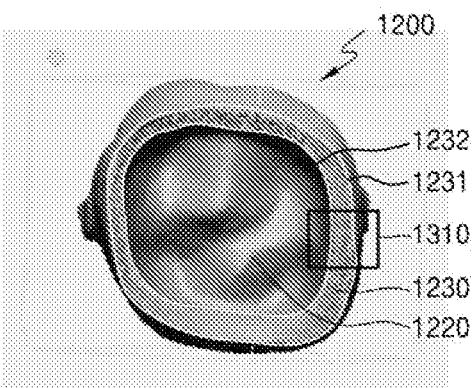
FIG. 13 is another view illustrating a second scan model acquired by scanning an artifact.

FIG. 13 is another diagram illustrating a second scan model acquired by scanning an artifact. In FIG. 13, the same configurations as in FIG. 12 are denoted by the same reference numerals, and accordingly, redundant descriptions thereof are omitted.

Referring to FIG. 13, a rear surface 1220 of the second scan model 1200 is illustrated.

Specifically, the rear surface 1220 of the second scan model 1200 may be in contact with or face a trimmed tooth (for example, the tooth 1020 in FIG. 10). In the second scan model 1200 acquired by scanning an artifact (for example, a crown) may have a line corresponding to a boundary of a cutting surface (or a surface bonded to the artifact) of the tooth 1020, for example, a margin line 1230. Specifically, the margin line 1230 may have a band shape formed by a joint line 1232 of an inner surface of the second scan model 1200 and a joint line 1231 of an outer surface of the second scan model 1200. Specifically, the margin line 1230 of a crown may correspond to a boundary of the cutting surface of the tooth 1020, and a line (for example, the 711 in FIG. 7A) corresponding to the boundary of the cutting surface of the tooth 1020 may be in contact with or coupled to the margin lines 1230 of the crown.

Figure 14A:
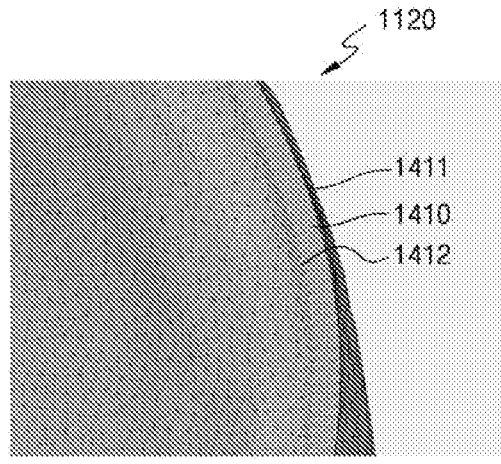
FIG. 14A is a view illustrating a margin line of a design model.

FIG. 14A is a view illustrating a margin line of a design model.

Specifically, FIG. 14A is a view illustrating a part of an inner surface of the design model 1120 illustrated in FIG. 11. Therefore, in FIG. 14A, the same configurations as in FIG. 11 are denoted by the same reference numerals as in FIG. 11.

An artifact (for example, a crown) may be manufactured based on the design model 1120, and the second scan model 1200 illustrated in FIGS. 12 and 13 may be generated by scanning the manufactured artifact. Accordingly, the second scan model 1200 may correspond to the design model 1120 as a whole. Specifically, a part of an inner surface of the design model 1120 illustrated in FIG. 14A may correspond to a region 1310 of FIG. 13.

An electronic device (for example, the electronic device 200, 300, 400, or 500) according to the embodiment of the present disclosure may acquire information on a margin line from the design model 1120. Specifically, the design model 1120 may include information on the margin line.

For example, the processor 310 may analyze the design model 1120 and extract, as a margin line 1410, an edge (for example, an edge 1411 or an edge 1412) connecting surfaces respectively corresponding to inner and outer surfaces of an artifact. Alternatively, the processor 310 may analyze the design model 1120 and extract a boundary surface (for example, the margin line 1410) connecting an inner surface of a model to an outer surface thereof as information corresponding to a margin line. Alternatively, the processor 310 may extract a boundary surface of an artifact to be coupled as information corresponding to a margin line.

Specifically, the design model 1120 may have margin information that is information on a margin line. Specifically, a portion corresponding to a margin line may be identified in the process of generating the design model 1120, and the identified portion may have margin points. For example, the margin points may indicate data values for restoring the line 1412 corresponding to a boundary of an inner surface of the design model 1120. Specifically, when the design model 1120 is generated in a mesh structure for three-dimensional modeling, the margin points may be point (for example, vertices of the mesh structure) indicating the line 1412 corresponding to the boundary of the inner surface of the design model 1120.

Figure 14B:
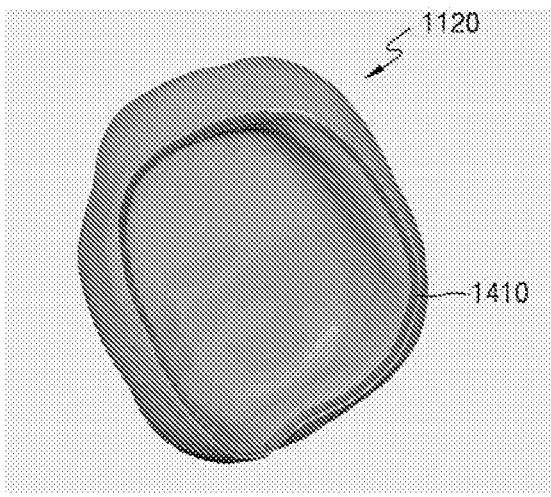
FIG. 14B is another view illustrating a margin line of a design model.

FIG. 14B is another view illustrating a margin line of a design model. In FIG. 14B, the same configurations as in FIGS. 11 and 14A are denoted by the same reference numerals.

Referring to FIG. 14B, the margin line 1410 of the design model 1120 may be formed around a boundary edge of the design model 1120 to be in contact with a circumference of a cut tooth as illustrated in FIG. 14B. Alternatively, when the design model 1120 corresponds to an implant crown, the margin line of the design model 1120 may be in contact with an abutment.

The processor 310 may acquire the margin line 1410 of the design model by using margin information included in the design model 1120.

In addition, the processor 310 may control the display 330 to output a user interface screen (not illustrated) including the design model 1120 for displaying a margin line. Accordingly, a user may check the margin line of the design model 1120. In addition, when there is an error in a margin line displayed on the displayed user interface screen, a user may correct at least a part of the margin line included in the design model 1120. In this case, the processor 310 of an electronic device (for example, the electronic device 200, 300, 400, or 500) may correct the margin line based on a user input (for example, a user input requesting correction of the margin line) received through an internally included user interface (for example, the user interface 350 in FIG. 5).

In addition, when the margin line is corrected, the processor 310 may control the display 330 to output a user interface screen (not illustrated) including the design model 1120 in which the corrected margin line is displayed.

Alternatively, a user may also set manually the margin line in the design model 1120. For example, the processor 310 of an electronic device (for example, the electronic device 200, 300, 400, or 500) may set a margin line based on a user input (for example, a user input for designating or identifying a margin line) received through an internally included user interface (for example, the user interface 350 in FIG. 5).

An electronic device (for example, the electronic device 200, 300, 400, or 500) according to the embodiment of the present disclosure may acquire information on a margin line of the second scan model 1200 based on the margin information included in the design model 1120. Specifically, the processor 310 may extract or identify the margin line of the second scan model 1200 based on the margin information included in the design model 1120.

Hereinafter, an operation of identifying the margin line of the second scan model 1200 and an alignment operation in the embodiment of the present disclosure are described in detail with reference to FIGS. 15 to 17.

Figure 15:
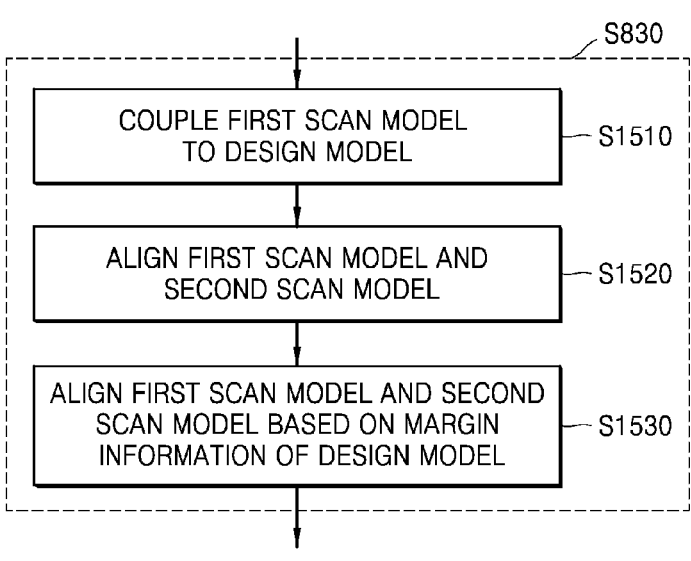
FIG. 15 is a flowchart illustrating an alignment operation performed according to an embodiment of the present disclosure.

FIG. 15 is a flowchart illustrating an alignment operation performed in the embodiment of the present disclosure.

Figure 16A:
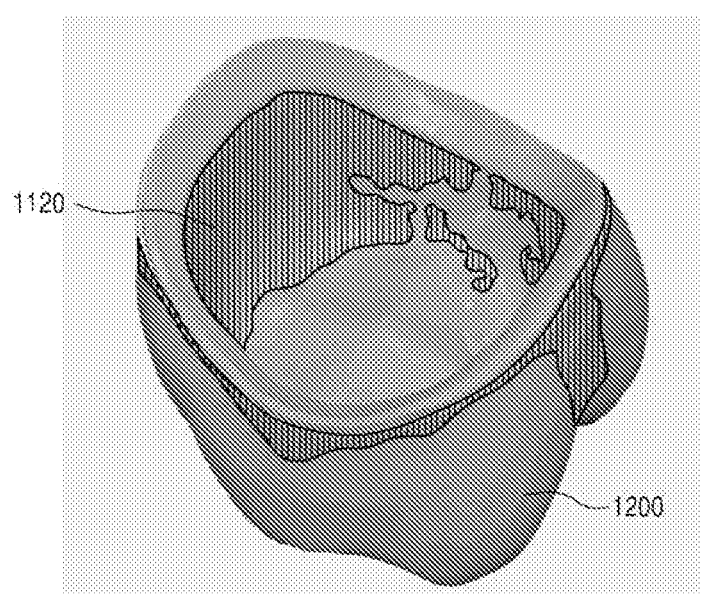
FIG. 16A is a view illustrating an alignment operation in an embodiment of the present disclosure.

FIG. 16A is a view illustrating the alignment operation in the embodiment of the present disclosure.

Figure 16B:
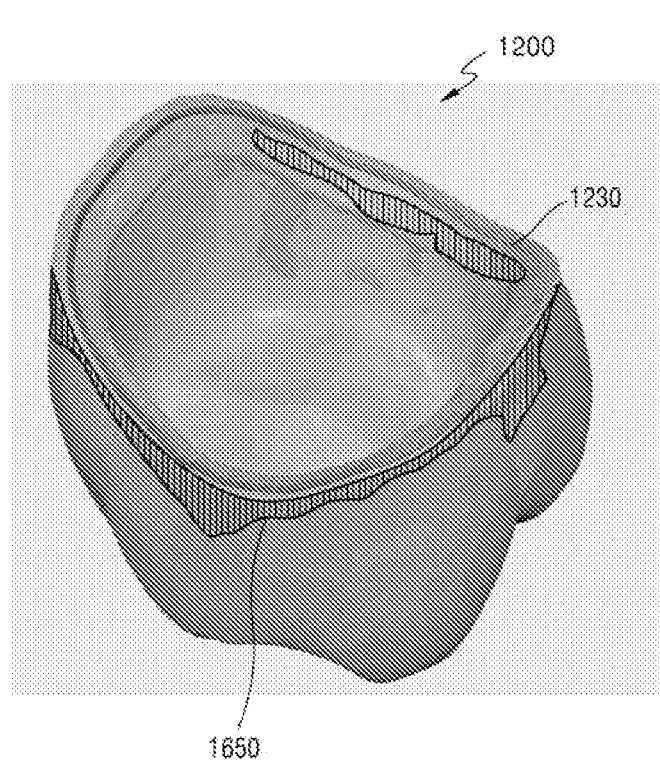
FIG. 16B is another view illustrating a margin line of a second scan model acquired by scanning an artifact.

FIG. 16B is another view illustrating a margin line of a second scan model acquired by scanning an artifact.

Figure 17:
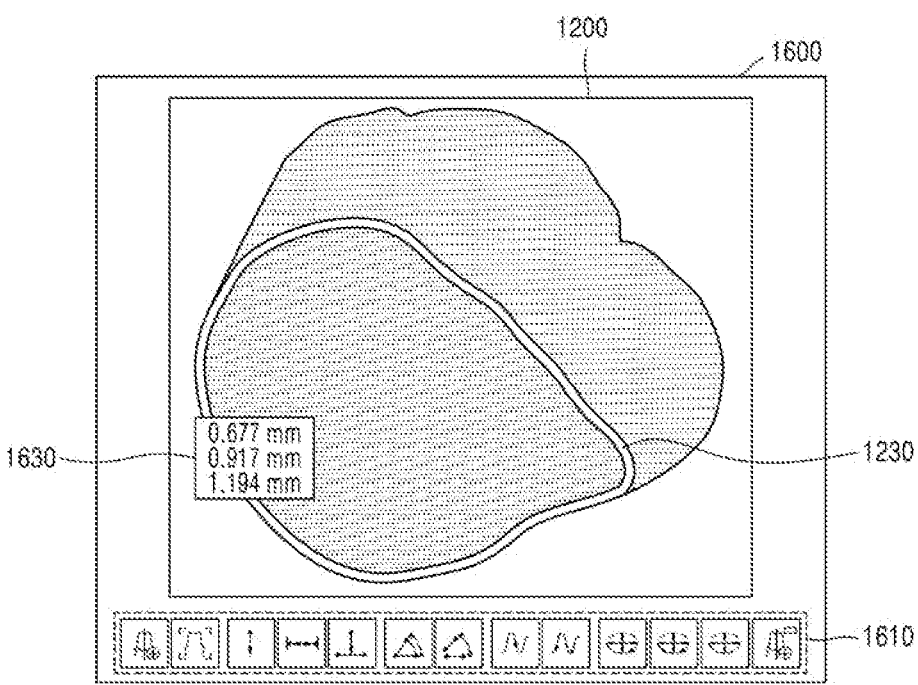
FIG. 17 is a diagram illustrating a margin line of a second scan model.

FIG. 17 is a view illustrating a margin line of a second scan model.

First, referring to FIG. 15, an embodiment of operation S830 of the alignment described with reference to FIG. 8A is illustrated.

Specifically, FIG. 15 is a diagram illustrating an alignment operation between the first scan model 1010 and the second scan model 1200 performed by an electronic device (for example, the electronic device 200, 300, 400, or 500) according to an embodiment. In addition, operations illustrated in FIG. 15 are described with reference to the configurations (for example, the first scan model 1010 in FIG. 10, the design model 1120 in FIG. 11, FIG. 14A, and FIG. 14B, the second scan model 1200 in FIGS. 12 and 13, and so on) described with reference to FIGS. 10 to 14B.

In the embodiment of the present disclosure, in a state in which the design model 1120 and the second scan model 1200 are first aligned, information on the margin line 1230 of the second scan model 1200 may be acquired by using the design model 1120. Specifically, when the design model 1120 and the second scan model 1200 are first aligned, a portion corresponding to the margin line 1410 of the design model 1120 in the second scan model 1200 may be identified as the margin line 1230 of the second scan model 1200. Here, the first alignment operation is described below in detail with reference to operation S1520.

An alignment operation of the first scan model 1010 and the second scan model 1200 in the embodiment of the present disclosure may be performed in two steps.

Referring to FIG. 15, the processor 310 may couple the first scan model 1010 to the design model 1120 (S1510) and may first align the first scan model 1010 coupled to the design model 1120 and the second scan model 1200 (S1510).

Specifically, an electronic device (for example, the electronic device 200, 300, 400, or 500) according to the embodiment is a second scan model 1200 may align the first scan model 1010 and the second scan model 1200 to identify an incorrectly-made part of the second scan model 1200 which may occur between the first scan model 1010 and the second scan model 1200.

In order to align the first scan model 1010 and the second scan model 1200, the design model 1120 may be used. Specifically, the first scan model 1010 and the second scan model 1200 may not have margin information, and the design model 1120 may have margin information. In addition, when the design model 1120 does not have margin information, the margin information may be generated by finding a boundary line of the design model 1120, or a user may manually select the margin information. The margin information and the margin line of the design model 1120 are described in detail with reference to FIGS. 14A and 14B.

In addition, because the design model 1120 is generated based on the first scan model 1010, the design model 1120 and the first scan model 1010 may be easily aligned. Accordingly, coupling the design model 1120 to the first scan model 1010 may be easily performed.

Therefore, the design model 1120 coupled to the first scan model 1010 may be first acquired, and subsequently, the design model 1120 coupled to the first scan model 1010 and the second scan model 1200 may be aligned (S1520).

For example, the processor 310 may search for close points between the design model 1120 coupled to the first scan model 1010 and the second scan model 1200 and align the design model 1120 coupled to the first scan model 1010 and the second scan model 1200 based on the searched close points (S1520).

In another example, the processor 310 may compare the entire shape of the second scan model 1200 with the entire shape of the design model 1120 and align the design model 1120 coupled to the first scan model 1010 and the second scan model 1200. For example, an iterative closest points (ICP) technology, an AI technology, manual alignment, and so on may be used to align the second scan model 1200 and the design model 1120, but the alignment method is not limited thereto. Here, alignment of operation S1520 may correspond to the 'first alignment' described above. In addition, the alignment of operation S1520 may be referred to as first-step alignment.

Hereinafter, a first-alignment operation between the second scan model 1200 and the design model 1120 is described in detail with reference to FIG. 16A.

The second scan model 1200 is acquired by scanning an artifact manufactured based on the design model 1120. Accordingly, an entire shape of the second scan model 1200 may correspond to an entire shape of the design model 1120. Therefore, alignment of the second scan model 1200 and the design model 1120 may be performed by comparing the entire shape of the second scan model 1200 with the entire shape of the design model 1120 or may be performed based on close points or points acquired by searching for similar points. For example, an ICP technology for finding and aligning points that are close to each other, an AI technology, manual alignment, and so on may be used to align the second scan model 1200 and the design model 1120, but the alignment method is not limited thereto.

Referring to FIG. 16A, the second scan model 1200 and the design model 1120 may be aligned as illustrated in FIG. 16A by performing the first-alignment operation described above.

Referring back to FIG. 15, the first scan model 1010 and the second scan model 1200 may be aligned based on margin information of the design model 1120 (S1530). Specifically, the design model 1120 coupled to the first scan model 1010 and the second scan model 1200 may be precisely aligned based on the margin information of the design model 1120 (S1530). Alignment performed in operation S1530 may be referred to as two-step alignment or second alignment.

A margin line of the second scan model 1200 may be identified based on the margin line 1410 of the design model 1120. Specifically, a margin line of the second scan model 1200 may be identified based on the design model 1120 and the second scan model 1200 which are first aligned, and the design model 1120 coupled to the first scan model 1010 and the second scan model 1200 may be aligned based on the margin line 1410 of the design model 1120 and the margin line 1230 of the second scan model 1200 (S1530). Accordingly, alignment of the first scan model 1010 and the second scan model 1200 may be completed. Operation S1530 is described below in detail with reference to FIGS. 16B to 17.

First, an operation for acquiring a margin line of the second scan model 1200 is described in detail with reference to FIG. 16B.

In the embodiment of the present disclosure, in a state in which the design model 1120 and the second scan model 1200 are first aligned, information on the margin line 1230 of the second scan model 1200 may be acquired by using the design model 1120. Specifically, when the design model 1120 and the second scan model 1200 are first aligned, a portion corresponding to the margin line 1410 of the design model 1120 in the second scan model 1200 may be identified as the margin line 1230 of the second scan model 1200. Here, the margin line 1230 may be automatically or manually identified.

Specifically, the processor 310 may automatically extract a margin line by analyzing the second scan model 1200 that is first aligned with the design model 1120.

Referring to FIG. 16B, a proximity region 1650 may be set in the second scan model 1200 aligned with the design model 1120 coupled to the first scan model, as described in FIG. 16A.

For example, the processor 310 may automatically set the proximity region 1650. Specifically, the processor 310 may set a proximity region of the second scan model 1200 that is first aligned with the design model 1120 based on margin points included in margin information of the design model 1120. In addition, a margin line of the second scan model 1200 may be searched within a proximity region set to the second scan model 1200. Specifically, in the second scan model 1200 aligned with the design model 1120, a region of the second scan model 1200 corresponding to the margin line 1410 of the design model 1120 may be set as the 'proximity region 1650'. Here, the proximity region 1650 may indicate an adjacent region of a margin line including the margin line. Specifically, the proximity region may indicate a region in the second scan model 1200 corresponding to 'an adjacent portion of the margin line 1410 including the margin line 1410 in the design model 1120'. Accordingly, the processor 310 may identify a margin line of the second scan model 1200 based on the set proximity region 1650.

Alternatively, the proximity region 1650 for extracting the margin line of the second scan model 1200 may be manually set based on a user input.

Specifically, a user may input a user input for designating the proximity region 1650 in the second scan model 1200 may be input to an electronic device (for example, the electronic device 200, 300, 400, or 500). Then, the processor 310 may set the proximity region 1650 based on a user input (for example, a user input for designating or identifying the proximity region 1650) received through a user interface (for example, the user interface 350 in FIG. 5) included in an electronic device (for example, the electronic device 200, 300, 400, or 500). Subsequently, the processor 310 may perform an operation of search for a margin line in the proximity region 1650 of the second scan model 1200.

In another example, the processor 310 may analyze the second scan model 1200 to extract a region corresponding to the margin line 1410 of the design model 1120, that is, extract an edge connecting surfaces respectively corresponding to inner and outer surfaces of an artifact as a margin line. Alternatively, the processor 310 may also extract the lowest circumference of an artifact as a margin line by analyzing the second scan model 1200 that is first aligned with the design model 1120.

In addition, the margin line 1230 identified in the second scan model 1200 may be output through a user interface screen.

Specifically, referring to FIG. 17, a user interface screen 1600 may include the second scan model 1200 on which the identified margin line 1230 is displayed. In the embodiment of the present disclosure, the processor 310 may control the user interface screen 1600, which includes the second scan model 1200 in which the margin line 1230 is displayed, to be output through the display 330.

In addition, the user interface screen 1600 may include measurement tools 1610 for measuring detailed numerical values, such as a width, a length, an interval, an angle, and/or an area of the margin line 1230. The processor 310 may acquire and provide measurement values corresponding to a user request based on the user input for selecting or operating the measurement tools 1610. That is, a user may check detailed numerical values of the margin line 1230 by inputting a user input for selecting the measurement tools 1610. For example, a user may input a user input for measuring thicknesses (or widths) of some points of the margin line 1230 to an electronic device (for example, the electronic device 200, 300, 400, or 500). Then, an electronic device (for example, the electronic device 200, 300, 400, or 500) may perform measurement corresponding to a user input and provide a measurement result 1630 onto the user interface screen 1600.

Alternatively, a user may also manually change or reset a margin line of the second scan model 1200. For example, the processor 310 of the electronic device 200, 300, 400, or 500 may perform an operation of changing or resetting the margin line of the second scan model 1200 based on a user input (for example, a user input for designating or identifying a margin line) received through an internally included user interface (for example, the user interface 350 in FIG. 5). In this case, the processor 310 may control the user interface screen 1600, which includes the second scan model 1200 in which the identified margin line is displayed, to be output through the display 330 based on the user input.

As described with reference to FIGS. 14A to 17, a margin line may be identified in each of the design model 1120 and the second scan model 1200.

Referring back to FIG. 15, the processor 310 may align a first scan model (for example, the region 1010 in FIG. 10) coupled to the design model 1120 and the second scan model 1200 based on the margin line extracted from the design model 1120 and the margin line extracted from the second scan model 1200 (S1530).

In addition, the alignment of the first scan model and the second scan model may also be performed in one step instead of the two-step alignment described above.

As illustrated in FIG. 11, the processor 310 may couple the first scan model 1010 to the design model 1120, and then align the design model 1120 and the second scan model 1200 by receiving a user input. Specifically, when a user manually inputs a margin line of the second scan model 1200, the processor 310 may align the design model 1120 and the second scan model 1200 by using the margin information of the design model 1120 and the input margin line Referring back to FIG. 8A, an incorrectly-made part in the second scan model may be identified, and information (hereinafter, referred to as 'first information') corresponding to the identified part in the second scan model 1200 may be generated, based on the alignment result of operation S830 (S840). Alternatively, referring back to FIG. 8B, an incorrectly-made part in the second scan model may be identified, and information (hereinafter, referred to as 'first information') corresponding to the identified part in the second scan model 1200 may be generated, based on the alignment result of operation S831 (S840).

The incorrectly-made part identified in operation S840 is described below in detail with reference to FIGS. 18 to 21.

Figure 18:
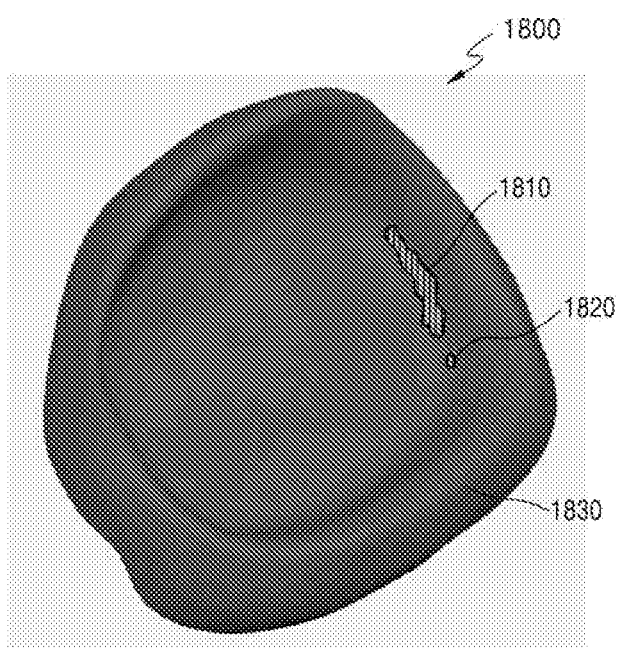
FIG. 18 is a view illustrating a user interface screen including information generated according to an embodiment of the present disclosure.

FIG. 18 is a view illustrating a user interface screen including information generated according to the embodiment of the present disclosure. A second scan model 1830 illustrated in FIG. 18 corresponds to the second scan model 1200 illustrated in FIGS. 12 to 16B, and accordingly, redundant descriptions thereof are omitted.

Referring to FIG. 18, the processor 310 may identify incorrectly-made parts 1810 and 1820 included in the second scan model 1830 and generate first information corresponding to the identified parts. In addition, the first information may be displayed on the second scan model 1830. Specifically, the processor 310 may make the identified incorrectly-made part and a correctly made part on the second scan model 1830 so as to be distinguished from each other. Specifically, the incorrectly-made parts 1810 and 1820 in the second scan model 1830 may be displayed by using at least one of different colors, transparencies, patterns, symbols, figures, and texts.

The incorrectly-made parts 1810 and 1820 illustrated in FIG. 18 may indicate parts where an inner surface of a crown collides with a trimmed tooth (for example, an abutment tooth). Specifically, the incorrectly-made parts 1810 and 1820 may indicate parts that need to be corrected and manufactured, such as shaving off the crown. In addition, the other parts of the second scan model 1830 excluding the incorrectly-made parts 1810 and 1820 may be well-made parts as intended.

In addition, the processor 310 may generate an image in which the incorrectly-made parts 1810 and 1820 of the second scan model 1830 are displayed and provide the image to a user. For example, the processor 310 may control the display 330 to display thereon the image in which the incorrectly-made parts 1810 and 1820 of the second scan model 1830 generated as described in operation S850 of FIG. 9A are displayed.

A user (for example, a manufacturer of a crown) may remanufacture the crown such that the crown does not collide with an abutment tooth, by seeing the image in which the incorrectly-made parts 1810 and 1820 are displayed and further etching an inner part of the crown corresponding to the displayed part. Therefore, it is possible to quickly complete reprocessing by easily checking an incorrectly-made part of a crown without directly coupling the crown to a patient's tooth.

In another example, the processor 310 may control the display 330 to display thereon an image in which the incorrectly-made parts 1810 and 1820 of the second scan model 1830 generated as described in operation S860 of FIG. 9B are displayed.

Figure 19:
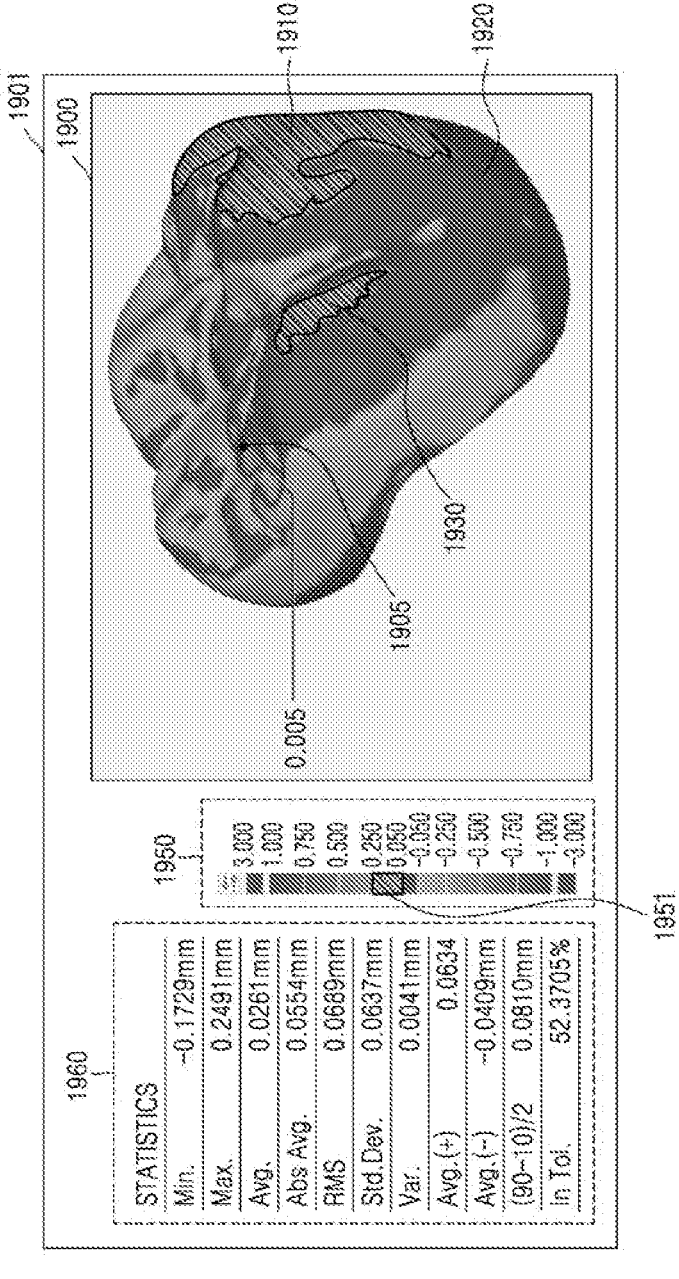
FIG. 19 is a view illustrating a user interface screen including information generated according to an embodiment of the present disclosure.

FIG. 19 is a view illustrating a user interface screen including information generated according to the embodiment of the present disclosure. A second scan model 1900 illustrated in FIG. 19 corresponds to the second scan model 1200 or 1830 described with reference to FIGS. 12 to 18, and accordingly, redundant descriptions thereof are omitted.

Referring to FIG. 19, a case in which the outside of the second scan model 1900 is displayed is illustrated as an example. A part that may collide with at least one adjacent tooth based on an outer surface 1920 of the second scan model 1900 may be identified as an incorrectly-made part, and the identified parts 1910 and 1930 may be displayed on the second scan model 1900. Here, the identified parts 1910 and 1930 may collide with adjacent teeth.

In addition, the processor 310 may classify the identified incorrectly-made parts into a plurality of levels depending on a degree of incorrection, and generate first information to display the classified levels by using at least one of different colors, transparencies, patterns, symbols, figures, and texts.

Specifically, the processor 310 controls the identified parts 1910 and 1930 to be displayed step by step depending on a degree of collision with adjacent tooth by using at least one of different colors, transparencies, patterns, symbols, figures, and texts.

For example, a plurality of color levels 1950 may be set depending on a degree of collision (specifically, a depth, a width, or a thickness of collision) between the identified parts 1910 and 1930 and an adjacent tooth, and the identified parts (1910 and 1930) may be displayed in a color corresponding to the set color level.

For example, when the identified parts 1910 and 1930 collide with an adjacent tooth by about 0.2 mm, the identified parts 1910 and 1930 may be displayed in a color 1951 set to a corresponding level (for example, a collision depth of 0.05 to 0.250 mm) among the plurality of color levels 1950.

For example, in scanning a tooth that is a target of dental treatment to acquire a first scan model, at least one tooth adjacent to the tooth that is a target of dental treatment may be scanned together with the tooth. In this case, the first scan model may indicate a tooth that is a target of dental treatment and at least one tooth adjacent to the tooth. Referring back to FIG. 10, the first scan model may be the model 1000 including the tooth 1020 that is a target of dental treatment and teeth adjacent thereto. Then, whether the second scan model 1900 collides with at least one tooth adjacent to the tooth that is a target of dental treatment may be determined based on a result of aligning the second scan model 1900 and the first scan model 1000.

In another example, there may be a case in which the identified parts 1910 and 1930, that are a part of an outer surface of the second scan model 1900, are thicker than parts of a design model corresponding thereto. In this case, it may be determined that the identified parts 1910 and 1930 collide with at least one adjacent tooth.

In addition, as described in FIG. 19, the identified parts 1910 and 1930 may be displayed step by step by using at least one of different colors, transparencies, patterns, symbols, figures, and texts depending on a degree of collision in the identified parts 1910 and 1930.

Specifically, the processor 310 may classify degrees of collision of the second scan model 1900 with at least one of a target object (for example, an abutment tooth) and at least one tooth adjacent to the target object (for example, the abutment tooth) into a plurality of levels and may generate the user interface screen 1901 by displaying the classified levels differently by using at least one of different colors, transparencies, patterns, symbols, figures, and texts.

For example, when the identified part 1910 collides with an adjacent tooth by 0.4 mm, the identified part 1910 may be displayed in yellow, and when the identified part 1930 collides with an adjacent tooth by 0.7 mm, the identified part 1910 may be displayed in light green.

In addition, when a user points a certain point (for example, a point 1905) in the second scan model 1900 in which the identified parts 1910 and 1930 are displayed, the processor 310 may control at least one value corresponding to the pointed point 1905 among measurement values 1960 to be output.

Figure 20:
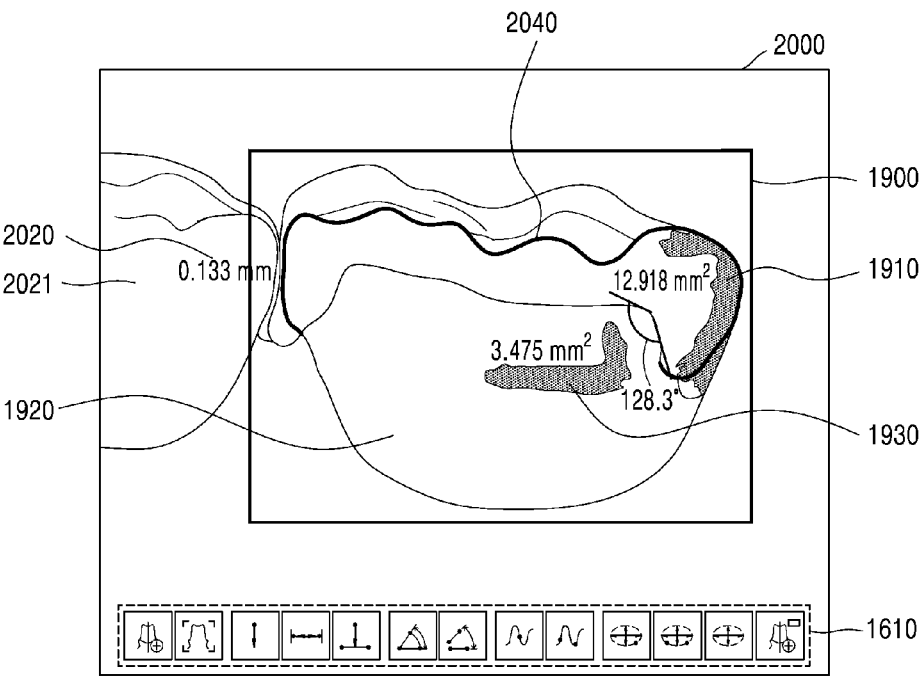
FIG. 20 is a view illustrating a user interface screen including information generated according to an embodiment of the present disclosure.

FIG. 20 is a view illustrating a user interface screen including information generated according to the embodiment of the present disclosure. In FIG. 20, the same configurations as in FIGS. 16A to 19 are denoted by the same reference numerals.

The processor 310 may include the second scan model 1900 in which the identified parts 1910 and 1930 are displayed and control a user interface screen 2000 for providing detailed measurement values in the second scan model 1900 to be output.

The user interface screen 2000 may provide at least one of a measurement value corresponding to a user input, a cross-section corresponding to the user input, and region information corresponding to the user input in the second scan model 1900.

For example, when a user selects at least one of the measurement tools 1610 and inputs a user input corresponding to the selected measurement tool, the processor 310 may generate information on at least one of a measurement value, a cross-section, and a region corresponding to the user input, based on the received user input and may control the generated information to be output onto the user interface screen 2000.

For example, a user may select at least one of the measurement tools 1610 to input a user input for measuring an interval between the second scan model 1900 and the adjacent tooth 2021. In this case, the processor 310 may acquire information on the interval between the second scan model 1900 and the adjacent tooth 2021 based on the received user input and control the acquired information that is '0.133 mm' 2020 to be output onto the user interface screen 2000.

In another example, a user selects at least one of the measurement tools 1610 to input a user input for measuring a size or an area of the part 1910 or 1930 identified as an incorrectly-made part in the second scan model 1900. In this case, the processor 310 may acquire information on regions of the identified part 1910 or 1930 based on the received user input and may control the acquired information '12.819 mm$^2$' and '3.475 mm$^2$' to be output onto the user interface screen 2000.

In another example, when a user draws a line 2040 crossing the second scan model 1900, the processor 310 receiving a user input indicating the line 2040 may control a user interface screen including information on a cross-section (hereinafter, 2010 in FIG. 21) formed by the line 2040 to be output. Hereinafter, descriptions thereof are made in detail with reference to FIG. 21.

Figure 21:
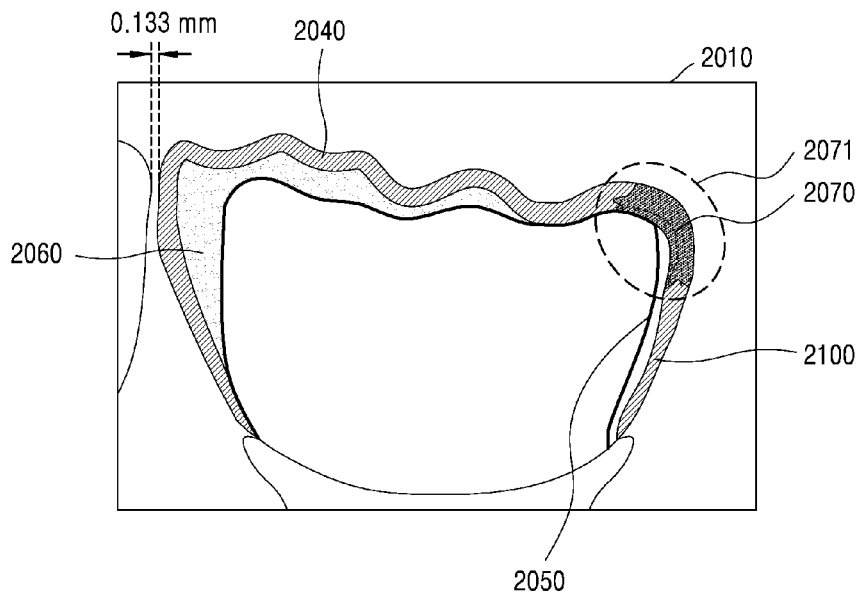
FIG. 21 is another view illustrating a user interface screen including information generated according to an embodiment of the present disclosure.

FIG. 21 is another view illustrating a user interface screen including information generated according to the embodiment of the present disclosure. In FIG. 21, the same configurations as in FIG. 20 are denoted by the same reference numerals.

Referring to FIG. 21, when a user draws a line 2040 crossing the second scan model 1900, the processor 310 receiving a user input indicating the line 2040 may control a user interface screen including information on the cross-section 2010 formed by the line 2040 to be output. Here, the cross-section 2010 may be a vertical cross-section of the second scan model 1900 which is configured by the line 2040 drawn by a user.

For example, the user interface screen including the cross-section 2010 may be output as a partial screen or a sub-screen of the user interface screen 2000 described in FIG. 20. Alternatively, when a user input indicating the line 2040 is received, the processor 310 control a screen output through the display 330 to be converted from the user interface screen 2000 illustrated in FIG. 20 into a screen including the cross-section 2010 illustrated in FIG. 21.

Referring to the cross-section 2010, a second scan model cut by the line 2040 is illustrated, and a crown 2100 is formed to surround a tooth (for example, an abutment tooth) 2050. In addition, a material for bonding between the tooth 2050 and the crown 2100 may be in a region 2060 between the tooth 2050 and the crown 2100.

In addition, the user interface screen output in the embodiment of the present disclosure may further include guide information for guiding correction of an incorrectly-made part of an artifact (for example, a crown). Specifically, the guide information may be displayed on a user interface screen in a form of i) a line (for example, a 'guideline') representing how an incorrectly-made part has to be additionally etched, ii) a pop-up window or a sub-screen representing how much mm of depth additional etching has to be made, iii) a pop-up window or a sub-screen representing how much a region having a certain length, area, or volume needs to be etched or reprocessed to correct an incorrectly-made part, iv) a message informing that new manufacturing is required, when correction may not be made, and so on.

Alternatively, the guide information may include information numerically indicating at least one of a depth, an area, a volume, and a length of a part to be additionally etched or corrected in a second scan model.

In addition, the guide information may be generated and displayed for each of incorrectly-made parts included in a second scan model (for example, the second scan model 1900). For example, referring to FIG. 19, guide information for guiding correction of the incorrectly-made part 1930 and guide information for guiding correction of the incorrectly-made part 1910 may be separately displayed.

In addition, when a user selects or points an incorrectly-made part on a user interface screen (for example, the user interface screen 1901 or 2000) described in FIG. 19 or 20, guide information corresponding to the incorrectly-made part selected or pointed by the user may be output on a user interface screen (for example, the user interface screen 1901 or 2000). For example, in FIG. 19, when a user selects the incorrectly-made part 1930 by using a mouse or so on, the processor 310 may control guide information for guiding correction of the incorrectly-made part 1930 to be displayed in the form of a pop-up window, a pop-up message, or so on in response to a user input indicating a user's selection.

For example, referring to FIG. 21, a user interface screen including the cross-section 2010 may be a screen on which a guideline 2070 indicating a part to be additionally etched in the second scan model indicating a crown is displayed. In addition, an incorrectly-made part (specifically, a part within a region of the guideline 2070) in the crown 2100 may be separately displayed on the cross-section 2010.

In addition, a user interface screen (for example, the user interface screen 2000 or 1901) output in the embodiment of the present disclosure may numerically display at least one of a depth, an area, a volume, and a length of a part to be additionally etched or corrected in the second scan model.

In addition, a user interface screen (for example, the user interface screen 2000 or 1901) output in the embodiment of the present disclosure may display an incorrectly-made part 2071, which is separately highlighted, in the second scan model (2071).

A method of providing information for dental treatment according to an embodiment of the present disclosure may be implemented in the form of program instructions that may be executed through various computers and recorded on a computer readable medium. In addition, an embodiment of the present disclosure may be a computer-readable recording medium on which one or more programs including instructions for executing a method of providing information for dental treatment are recorded.

A computer-readable recording medium may include program instructions, data files, data structures, and so on alone or in combination. Program instructions recorded on the medium may be specially designed and configured for the present disclosure or may also be known and usable to those skilled in computer software. For example, computer-readable recording media include magnetic media, such as a hard disks, a floppy disk, and a magnetic tape, optical media, such as a compact disk-read only memory (CD-ROM) and a digital video disk (DVD), magneto-optical media, such as a floptical disk, and a hardware device specially configured to store and execute program instructions, such as ROM, random access memory (RAM), and flash memory. For example, program instructions include not only machine language codes generated by a compiler or so on but also high-level language codes that may be executed by a computer by using an interpreter.

Here, a device-readable storage medium may be provided in the form of a non-transitory storage medium. Here, the 'non-transitory storage medium' is a tangible device and does not include a signal (for example, an electromagnetic wave), and this term does not distinguish between a case in which data is semi-permanently stored in a storage medium and a case in which data is temporarily stored. For example, the 'non-transitory storage medium' may include a buffer in which data is temporarily stored.

According to one embodiment, the method according to various embodiments of the present disclosure may be provided by being included in a computer program product. The computer program product may be traded between a seller and a buyer as a commodity. A computer program product may be distributed in the form of a device-readable storage medium (for example, a CD-ROM) or may be distributed through an application store (for example, the Play Store™) or may be distributed (for example, downloaded or uploaded) online or directly between two user devices (for example, smartphones). In the case of online distribution, at least a part of a computer program product (for example, a downloadable app) may be temporarily stored or temporarily generated in a storage medium readable by a device, such as a manufacturer's server, an application store server, or a relay server's memory.

Specifically, the method of providing information for dental treatment according to an embodiment of the present disclosure may be implemented as a computer program product including a recording medium storing a program for performing an operation of acquiring a sentence composed of multiple languages, and an operation of acquiring vector values respectively corresponding to words included in a multilingual sentence by using a multilingual translation model, converting the acquired vector values into vector values corresponding to a target language, and acquiring a sentence composed of the target language based on the converted vector values.

Although embodiments are described in detail above, the scope of the present disclosure is not limited thereto, and various modifications and improvements made by those skilled in the art using the basic concept of the present disclosure defined in the following claims are also included in the scope of the present disclosure.

The invention claimed is:

1. A method of providing information for dental treatment, the method comprising:
   acquiring a first scan model by scanning a target object;
   acquiring a design model that is generated based on a first scan model and is a model for an artifact to be attached to the target object;
   after the artifact has been manufactured based on the design model, acquiring a second scan model generated by scanning the artifact;
   aligning the first scan model and the second scan model based on a margin line corresponding to a coupling boundary between the target object and the artifact;
   identifying a part of the second scan model corresponding to an incorrectly-made part of the artifact, based on a result of the alignment; and
   displaying guide information for guiding correction of the incorrectly-made part of the artifact, based on information about the identified part.

2. The method of claim 1, wherein the aligning includes aligning the first scan model coupled to the design model, and the second scan model.

3. The method of claim 1, wherein
   the target object is a tooth or an abutment of an implant,
   the artifact is a crown.

4. The method of claim 3, wherein the aligning includes aligning the first scan model coupled to the design model and the second scan model, based on a first line corresponding to the margin line of the target object in the design model and a second line corresponding to the margin line of the target object in the second scan model.

5. The method of claim 1, wherein the identifying the part of the second scan model includes:

based on the result of the alignment, identifying the part of the second scan model which collides with at least one of: the target object; and at least one tooth adjacent to the target object.

6. The method of claim 5, further comprising:

classifying degrees of collision of the second scan model with at least one of the target object and at least one tooth adjacent to the target object into a plurality of levels, and generating information such that the plurality of classified levels are differently displayed by using at least one of different colors, transparencies, patterns, symbols, figures, and texts.

7. The method of claim 1, further comprising outputting a user interface screen including the information about the identified part and the guide information.

8. The method of claim 1, wherein the information about the identified part includes information on at least one of a thickness, a length, an area, and a volume of the identified part.

9. The method of claim 1, wherein the artifact is one of a crown, an inlay, and an onlay.

10. The method of claim 1, wherein the acquiring of the design model includes acquiring a design model obtained by three-dimensionally modeling the artifact to be attached to the target object, through a computer aided design (CAD) based on the first scan model.

11. The method of claim 10, wherein the aligning includes comparing an entire shape of the design model coupled to the first scan model with an entire shape of the second scan model, and first-aligning the design model and the second scan model, and second-aligning the design model and the second scan model, which are first-aligned, based on margin information.

12. An electronic device that provides information for dental treatment, the electronic device comprising:

a communication interface configured to receive data from an external device; and a processor configured to execute at least one instruction to generate information for dental treatment, wherein the processor acquires a first scan model by scanning a target object, acquires a design model that is generated based on a first scan model and indicates an artifact to be attached to the target object, after the artifact has been manufactured based on the design model, acquires a second scan model generated by scanning the artifact, aligns the first scan model and the second scan model based on a margin line corresponding to a coupling boundary between the target object and the artifact, identifies a part of the second scan model corresponding to an incorrectly-made part of the artifact, based on a result of the alignment, and displays guide information for guiding correction of the incorrectly-made part of the artifact, based on information about the identified part.

13. The electronic device of claim 12, wherein the processor aligns the first scan model coupled to the design model and the second scan model, based on the margin line.

14. The electronic device of claim 12, further comprising a display, wherein the processor controls the display to output a user interface screen including the information about the identified part and the guide information.

15. A non-transitory computer-readable recording medium on which one or more programs are recorded, the computer-readable recording medium comprising instructions for performing a method of providing information for dental treatment, the method including:

acquiring a first scan model by scanning a target object;

acquiring a design model that is generated based on a first scan model and is a model for an artifact to be attached to the target object;

after the artifact has been manufactured based on the design model, acquiring a second scan model generated by scanning the artifact;

aligning the first scan model and the second scan model based on a margin line corresponding to a coupling boundary between the target object and the artifact;

identifying a part of the second scan model corresponding to an incorrectly-made part of the artifact, based on a result of the alignment; and displaying guide information for guiding correction of the incorrectly-made part of the artifact, based on information about the identified part.

* * * * *